(12) United States Patent
Dabrowski et al.

(10) Patent No.: US 8,652,353 B2
(45) Date of Patent: Feb. 18, 2014

(54) LIQUID CRYSTAL CARBONATE AND LIQUID CRYSTAL MEDIUM CONTAINING THE SAME WITH POSITIVE OR NEGATIVE DIELECTRIC ANISOTROPY

(75) Inventors: Roman Slawomir Dabrowski, Warsaw (PL); Przemyslaw Kula, Warsaw (PL); Artur Choluj, Gora Kalwaria (PL); Jerzy Dziaduszek, Warsaw (PL); Katarzyna Garbat, Nieporet (PL)

(73) Assignee: Wojskowa Akademia Techniczna, Warszawa (PL)

( * ) Notice: Subject to any disclaimer, the term of this patent is extended or adjusted under 35 U.S.C. 154(b) by 0 days.

(21) Appl. No.: 13/553,352

(22) Filed: Jul. 19, 2012

(65) Prior Publication Data
US 2013/0020532 A1    Jan. 24, 2013

(30) Foreign Application Priority Data

Jul. 20, 2011  (PL) .......................... 395708

(51) Int. Cl.
| | |
|---|---|
| *C09K 19/06* | (2006.01) |
| *C09K 19/52* | (2006.01) |
| *C09K 19/34* | (2006.01) |
| *C09K 19/30* | (2006.01) |
| *C09K 19/12* | (2006.01) |
| *C09K 19/00* | (2006.01) |
| *C07C 69/96* | (2006.01) |
| *C07C 331/00* | (2006.01) |
| *C07C 381/00* | (2006.01) |
| *C07C 41/00* | (2006.01) |
| *C07C 43/02* | (2006.01) |
| *C07C 43/20* | (2006.01) |

(52) U.S. Cl.
USPC ............. 252/299.6; 252/299.01; 252/299.61; 252/299.63; 252/299.66; 428/1.1; 558/10; 558/13; 558/260; 558/270; 570/129; 568/642

(58) Field of Classification Search
USPC ............... 252/299.01, 299.6, 299.61, 299.63, 252/299.66; 428/1.1; 558/10, 13, 260, 270; 568/542; 570/129
See application file for complete search history.

(56) References Cited

U.S. PATENT DOCUMENTS

| | | | | | |
|---|---|---|---|---|---|
| 4,594,465 | A | * | 6/1986 | Kam Ming Chan et al. | . 568/642 |
| 5,382,380 | A | * | 1/1995 | Kurihara et al. | ......... 252/299.66 |
| 5,494,605 | A | * | 2/1996 | Kurihara et al. | ......... 252/299.66 |

\* cited by examiner

*Primary Examiner* — Geraldina Visconti
(74) *Attorney, Agent, or Firm* — King & Schickli, PLLC

(57) ABSTRACT

A novel liquid crystalline carbonate and the mixture containing the same:

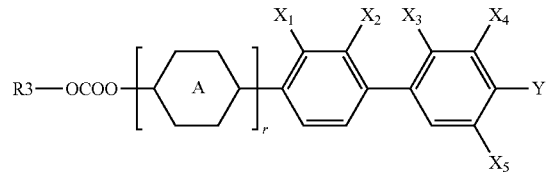

wherein R3 is an alkyl ($H_{2n+1}C_n$) or an alkenyl ($H_{2n-1}C_n$) group, each of 1 to 12 carbon atoms, the ring A is laterally unsubstituted benzene or pyridine or pyrimidine or trans-substituted cyclohexane ring, symbol r is 0 to 2; the lateral substituents: $X_2$, $X_3$, $X_4$ and $X_5$ in the benzene rings represent independently hydrogen or fluorine or chlorine atoms, $X_1$ is hydrogen or fluorine atom and simultaneously at least one of the substituents: $X_2$, $X_3$ and $X_4$ is fluorine or chlorine atoms, Y is an alkyl or an alkyloxy or an alkenyl or an alkenyloxy group, each of 1 to 12 carbon atoms or hydrogen or fluorine or chlorine atom or NCS group are described.

26 Claims, No Drawings

LIQUID CRYSTAL CARBONATE AND LIQUID CRYSTAL MEDIUM CONTAINING THE SAME WITH POSITIVE OR NEGATIVE DIELECTRIC ANISOTROPY

This application claims priority to Polish Patent Application No P-395708 field Jul. 12, 2011, which is wherein incorporated by reference in its entirety.

BACKGROUND OF THE INVENTION

1. Field of the Invention

This invention relates to a novel liquid crystalline carbonate and liquid crystal medium containing the same with positive or negative dielectric anisotropy. The medium is intended for applications in various photonic devices and displays, especially as light beam modulators working in the different ranges of electromagnetic spectrum.

2. Background of the Invention

Nematic liquid crystalline media with positive or negative dielectric anisotropy are commonly applied in displays and photonic devices (optical valves, phase shifters, attenuators etc.) which use various electrooptical effects. One of the most widely known is ECB (Electrically Controlled Birefringence), described for the first time in articles [M. Schiekel, K. Fahrenschon, *Appl. Phys. Lett*, 19, 391 (1973); G. Labrunie, J. Robert, *J. Appl. Phys.*, 44, 4869 (1973) and S. Matsumoto, M. Kawamoto, K. Mizunoya, *J. Appl. Phys.*, 47, 3842 (1976)]. Both $\Delta\varepsilon > 0$ and $\Delta\varepsilon < 0$ liquid crystal media can be applied for this purpose.

In the mentioned effect a liquid crystalline medium (a mutlicomponent nematic mixture, preferably of eutectic composition) characterized by negative or positive dielectric anisotropy is placed between two transparent electrodes, or one transparent and one reflective electrodes.

In the former case a liquid crystal with negative dielectric anisotropy ($\Delta\varepsilon < 0$) is aligned perpendicularly to the electrodes surface in the off state (without electric field). When external electric field is applied the reorientation of liquid crystalline molecules occurs to parallel (planar) position in respect to the electrodes surface. This mod is also called Vertical Alignment and has been modified many times (MVA, PVA, ASV) in order to improve the viewing angle.

In the latter case when a liquid crystal of positive anisotropy ($\Delta\varepsilon > 0$) and homogenic alignment (parallel to electrodes surfaces) is applied, then in the presence of external electric field its molecules are reoriented perpendicularly to the electrode surface.

The fitting condition of the optical path to the thickness of the cell filled with liquid crystal is given by an equation:

$$d \cdot \Delta n = \lambda r / 2$$

where: d—liquid crystal cell thickness, $\Delta n$—birefringence of liquid crystal, $\lambda r$—wavelength of light beam passing through the liquid crystal. From this dependence, it can be concluded that the devices of smaller thickness demand the liquid crystal medium of higher birefringence. At the same time, because of the $\Delta n$ decreases with increasing the wavelength, for devices operating at infrared region (for telecommunication applications $\lambda r \sim 1.5$ μm is preferred) high birefringence liquid crystals are needed. For this wavelength region the necessary value of birefringence $\Delta n$ is 0.15 for d=5 μm and 0.25 for d=3 μm. It corresponds to values of $\Delta n$ in the range of 0.25-0.3 for the first example and 0.45-0.5 for the second example in visible light ($\lambda$=600 nm).

Threshold voltage for reorientation in ECB effect is determined by an equation:

$$V_{th} = \sqrt{\frac{\pi^2 K_{33}}{\varepsilon_o |\Delta\varepsilon|}}$$

When the device is controlled by an active matrix, $\Delta\varepsilon$ cannot be too large, because of undesired increase of the conductivity. Optimum $\Delta\varepsilon$ values are between 3 and 9 and they assure the controlling voltages at the 5 to 7 V range.

Response times are given by equations:

$$t_{on} \propto \frac{\gamma \cdot d^2}{\Delta\varepsilon(V/V_{th})}, \quad t_{off} \propto \frac{\gamma \cdot d^2}{k_{ii}}$$

where reorientation times ($t_{on}$ rise time and $t_{off}$ fall time) depend on the material constants of the used liquid crystal (rotational viscosity $\gamma$, dielectric anisotropy $\Delta\varepsilon$, elastic constants $k_{ii}$—various depending on the effect) as well as on the cell geometry and its driving parameters (thickness d and applied voltage V to threshold voltage $V_{th}$).

The decrease of the liquid crystal layer thickness leads to the decrease of response times. An important parameter is the temperature dependence of optical response times especially in the case of high power laser applications.

Most of the currently used liquid crystal media possess the birefringence from 0.1 to 0.14. They are usually cyclohexyl, bicyclohexyl and phenylocyclohexyl derivates of benzene substituted with one, two or three fluorine atoms, see [S. M. Kelly, M. O'Niel *Handbook of Advanced Electronic and Photonic Materials and Devices*, edited by H. S. Nalwa, Vol 7: *Liquid Crystals, Displays and Laser Materials* (2000), R. Dąbrowski, *Liquid crystalline materials for active matrix displays, Biul. WAT,* 48, No. 4, p. 5 (1999)].

In order to obtain liquid crystal mixtures of higher birefringence biphenyl, terphenyl, tolane, phenyl-tolane and even quaterphenyl and/or biphenyltolane derivates can be applied. Many of such compounds were described in patents [EP 0 704 512, EP 0739 876, DE 42 03 719, EP 0 733 692, EP 0 761 799, EP 89 10 3414, WO 97/38062, DE 43 26 020, DE 38 07 958, DE 42 22 371, EP 0 575 791, EP 0 736 513, EP 0785 179], and in review articles. [R. Dąbrowski, *Liquid crystalline materials for active matrix displays, Biul. WAT,* 48, No 4, p. 5 (1999), M. Hird, *Fluorinated liquid crystals—properties and applications, Chem. Soc. Rev.,* 36, 2070-2095 (2007), P. Kula, A. Spadlo, J. Dziaduszek, M. Filipowicz, R. Dąbrowski, J. Czub and S. Urban, *Mesomorphic, dielectric and optical properties of fluorosubstituted biphenyls, terphenyls and quaterphenyls, Opto-Electronics Review,* 16(4), 379-385 (2008)].

The length of alkyl and alkyloxy terminal chains, the positions of the lateral substituents and the character of a terminal polar group are crucial factors for observed mesogenic properties: melting points, clearing points, the type of liquid crystal phases and their transitions temperatures, viscosity, dielectric anisotropy, optical anisotropy and elastic constants. Although their relation to chemical structure is better known nowadays, there are still many unpredictable and surprising correlations, which have influence on devices performance, therefore further experimental research is needed.

Fluorine atoms substituted in lateral positions often decrease melting points and depress smectogenity in a favorable way. At the same time their presence leads to the decrease of clearing point and birefringence. The optimum number of fluorine atoms is from 1 to 3.

The esters of carbonic acid prepared from cholesterol [W. Elser, W. J. L. Pohlmann, P. R. Boyd, *Mol. Cryst. Liq. Cryst.*, 20, 77 (1973)] or other alcohols or hydroxy esters [D. Demus, *Flussige Kristalle in Tabellen, VEB DeutscherVerlagfur Grunstqffindustrie edition*, Leipzig 1974, p. 73] are known.

Liquid crystal compounds with terphenyl rigid core and carbonate group in a terminal chain ($H_{2n+1}C_nOCOO$ or $H_{2n-1}C_nOCOO$) have not been obtained or investigated yet (in Liquid Crystals database there are no three ring compounds with $H_{2n+1}C_nOCOO$ or $H_{2n-1}C_nOCOO$ terminal groups) but in [U.S. Pat. No. 4,594,465] patent besides alkyl and alkyloxy terphenyl derivates also carbonates with formulas 1, 2 and 3:

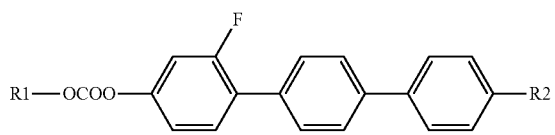

1

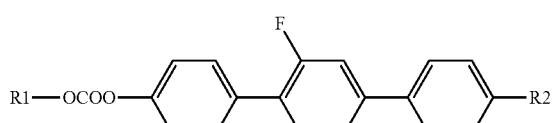

2

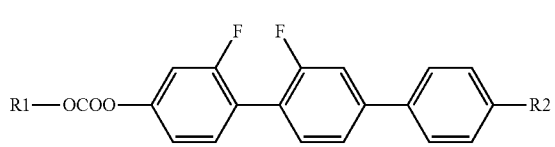

3 wherein R1 or R2 are alkyl groups $H_{2n+1}C_n$ have been claimed, although their mesogenic properties were not presented in any form.

DETAILED DESCRIPTION OF THE INVENTION

During the research of various terphenyl derivates, it has been determined that compounds 1-3 mentioned in the [U.S. Pat. No. 4,594,465] patent, as well as similar compounds 4-6 with fluorine atoms closer to carbonate group:

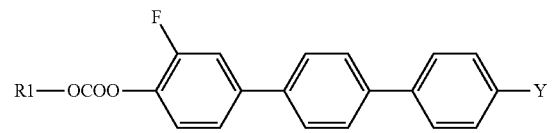

4

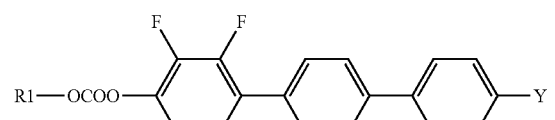

5

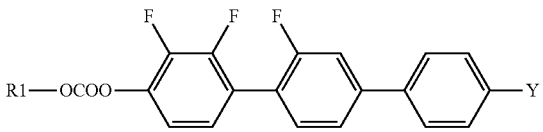

6 are not especially favorable for technical applications. The most of them have high melting points or possess mainly orthogonal smectic phases (A, B, E) in a wide temperature range. A nematic phase is often observed at high temperatures in narrow temperature range, what is shown on examples in detail. Unexpectedly it has been determined that if fluorine atom or atoms are further away from carbonate group such compounds have the wide nematic phase temperature range and more preferable melting parameters (temperature and enthalpy) and sometimes also the presence of the smectic C phase is observed.

The invention relates to a novel family of liquid crystal compounds with medium or high birefringence with preferable properties as components of mixtures designed for various devices and displays working in different electrooptical modes and especially for the ECB mode.

The first aspect of this invention is novel liquid crystalline carbonate of general formula:

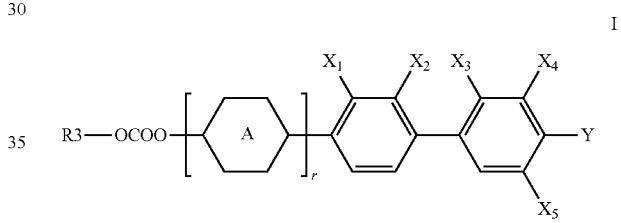

I wherein R3 is an alkyl ($H_{2n+1}C_n$) or an alkenyl ($H_{2n-1}C_n$) group, each of 1 to 12 carbon atoms (n integer of 1 to 12), the ring A is laterally unsubstituted benzene or pyridine or pyrimidine or trans-substituted cyclohexane ring, symbol r is 0 to 2; the lateral substituents: $X_2$, $X_3$, $X_4$ and $X_5$ in the benzene rings represent independently hydrogen or fluorine or chlorine atoms, $X_1$ is hydrogen or fluorine atom and simultaneously at least one of the substituents: $X_2$, $X_3$ and $X_4$ is fluorine atom or chlorine atom, Y is an alkyl ($H_{2m+1}C_m$) or an alkyloxy ($H_{2m+1}C_mO$) or an alkenyl ($H_{2m-1}C_m$) or an alkenyloxy ($H_{2m-1}C_mO$) group, each of 1 to 12 carbon atoms (m integer of 1 to 12) or hydrogen or fluorine or chlorine atom or NCS group.

The preferable positions of lateral substituents in the compound I, wherein A is benzene ring and Y is an alkyl ($H_{2m+1}C_m$) or an alkenyl ($H_{2m-1}C_m$) or an alkyloxy ($H_{2m-1}C_mO$) group are the following:

$X_1=X_2=X_3=X_5=H$, $X_4=F$; $X_1=X_2=X_5=H$, $X_3=X_4=F$;
$X_1=X_2=X_4=X_5=H$, $X_3=F$; $X_1=X_4=X_5=H$, $X_2=X_3=F$;
$X_1=X_3=X_4=X_5=H$, $X_2=F$; $X_3=X_4=X_5=H$, $X_1=X_2=F$;
$X_1=X_5=H$, $X_2=X_3=X_4=F$; $X_5=H$, $X_1=X_2=X_3=X_4=F$;
$X_1=X_3=X_5=H$, $X_2=X_4=F$; $X_1=X_2=X_3=H$, $X_4=X_5=F$;
$X_1=X_3=H$; $X_2=X_4=X_5=F$.

For compounds with a nematic phase in wide temperature range it is preferred if R3 is a short chain: methyl, ethyl, ethenyl, propyl or propenyl. Following subformulas I.1-I.11 derived from general formula I according to the invention have exceptionally favorable properties.

I.1
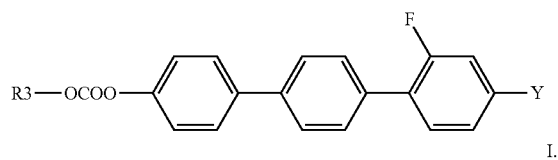

I.2
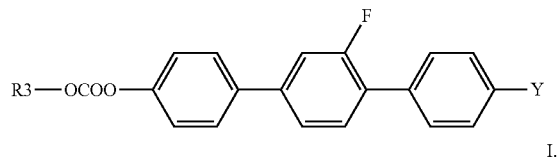

I.3
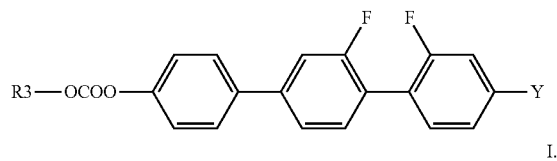

I.4
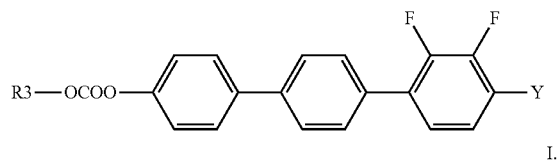

I.5
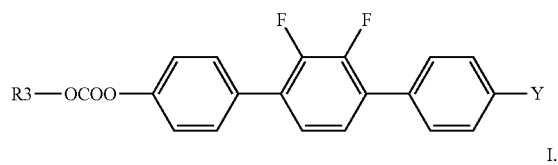

I.6
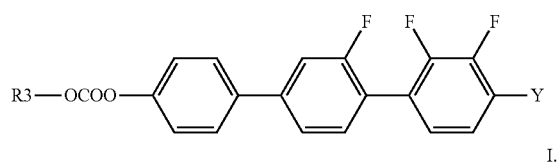

I.7
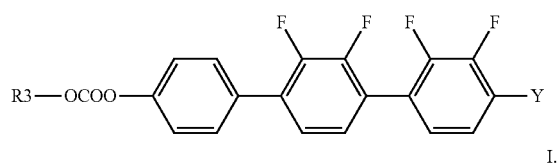

I.8
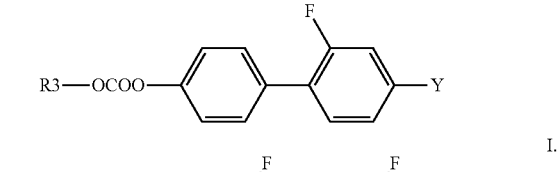

I.9
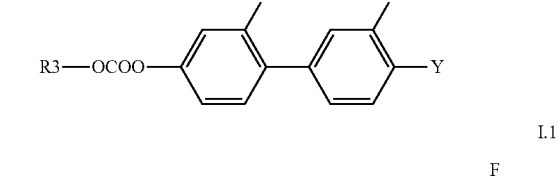

I.10
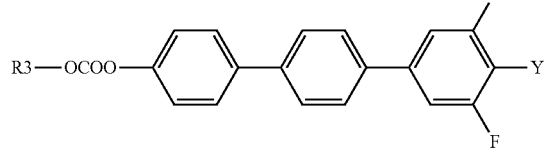

-continued

I.11
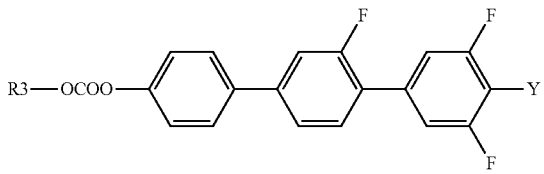

Two ring compounds are usually monotropic or virtual nematics and fluorine atom position in respect to the carbonate (OCOO) group has not such distinctive influence on the type of phase as in the case of three ring compounds.

Examples of preferred structures, where A is a cyclohexane ring, are compounds expressed by formula I.12-I.14:

I.12
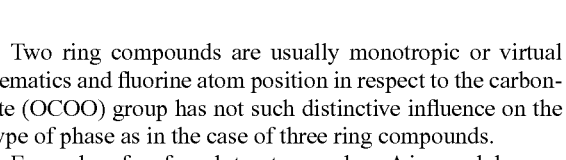

I.13
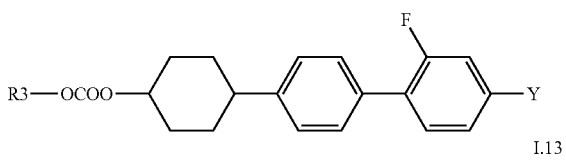

I.14
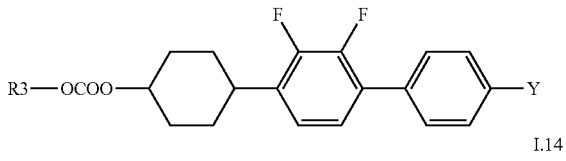

Compounds with longer terminal chains R3 and Y in the form of alkyl, alkenyl or alkyloxy groups, wherein the combined number of carbon atoms exceeds 8 may often show the presence of smectic phases, among them also tilted SmC phase is present. It is especially characteristic for structure of formula I.4. They are useful for the formulation of ferroelectric mixtures.

The second aspect of this invention is a nematic liquid crystalline medium with negative or positive dielectric anisotropy $\Delta\epsilon$ and its value has weak dependence on the frequency of the electric field or strong dependence on the frequency of the electric field. In the second case the value of $\Delta\epsilon$ changes from positive to negative as the frequency of the field increases. The compounds I not only change the dielectric properties in a liquid crystal medium in desired direction but also have ability to increase its nematic character because they exhibit the nematic phase in a wide temperature range.

According to this invention the nematic medium composed of at least two compounds of general formula I wherein R3 is an alkyl ($H_{2n+1}C_m$) or an alkenyl ($H_{2n-1}C_n$) group, each of 1 to 12 carbon atoms (n integer of 1 to 12), the ring A is laterally unsubstituted benzene or pyridine or pyrimidine or trans-substituted cyclohexane ring, symbol r is 0 to 2; the lateral substituents: $X_2$, $X_3$, $X_4$, $X_5$ in the benzene rings represent independently hydrogen or fluorine or chlorine atoms, $X_1$ is hydrogen or fluorine atom and simultaneously at least one of the substituents: $X_2$, $X_3$ and $X_4$ is fluorine atom or chlorine atom, Y is an alkyl ($H_{2m+1}C_m$) or an alkyloxy ($H_{2m+1}C_mO$) or an alkenyl ($H_{2m-1}C_m$) or an alkenyloxy ($H_{2m-1}C_mO$) group, each of 1 to 12 carbon atoms (m integer of 1 to 12) or hydrogen or fluorine or chlorine atom or NCS group. It can also comprise additionally one or more new or known compounds of general formula II:

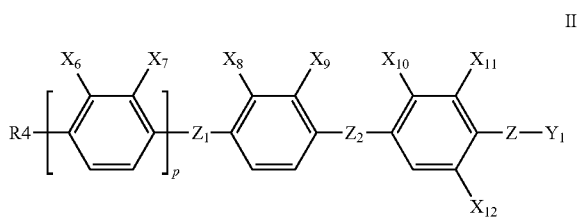

wherein R4 is an alkyl ($H_{2s+1}C_s$) or an alkenyl ($H_{2s-1}C_s$) or an alkylphenyl ($H_{2s+1}C_sC_6H_4$) or an alkyl cyclohexyl ($H_{2s+1}C_sC_6H_{10}$) or an alkylbicyclohexyl ($H_{2s+1}C_sC_6C_{10}$—$C_6H_{10}$) group, each of 1 to 7 carbon atoms (s integer of 1 to 7), symbol p is 0 to 2; the lateral substituents: $X_6$-$X_{12}$ represent independently hydrogen or fluorine or chlorine atoms, $Y_1$ is an alkyl ($H_{2t+1}C_t$) or an alkenyl ($H_{2t-1}C_t$) group, each of 1 to 12 carbon atoms (t integer of 1 to 12) or hydrogen or fluorine or chlorine atom or NCS or $CF_3$ group; Z is oxygen atom or single bond, $Z_1$ and $Z_2$ represent independently single bond or $CF_2O$ group or triple bond (C≡C) and/or one or few compounds from the compounds of the formulas III.1-III.6, wherein R5 and R6 are independently an alkyl or an alkenyl group, each of 1 to 6 carbon atoms.

The mixture components III.1-III.6 increase the nematic character of the mixture and additionally lower its viscosity. They are

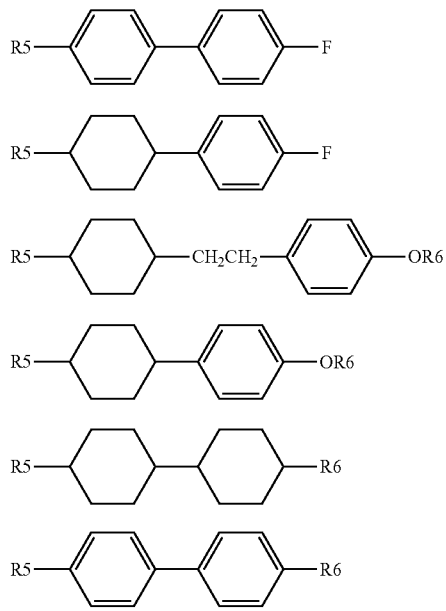

The most preferable compounds III are wherein R5 and R6 are independently alkyl groups such as $C_2H_5$, $C_3H_7$, $C_4H_9$ or $C_5H_{11}$ in case of compounds III.1, III.2, III.3, III.4, III.5 and III.6, or the same alkyl group and also alkenyl group such as CH=$CH_2$, CH=CH—$Ch_3$, $CH_2$—$CH_2$—CH=$CH_2$ or $CH_2$—CH=CH—$CH_3$ in the case of compounds III.4 or III.5.

Other components of all described mixtures may also be reactive monomers with polymerization initiators for obtaining stabilizing polymer network, or/and "hockey stick" type molecules for increasing the torsion tensions leading to the decrease of the relaxation "off" time (VA effect), or/and dichroic dye for polarizers free imaging or/and stable radicals compounds for photo-stability increase. The amount of these dopants may vary from 1 to several percents and their optimal concentration is well known in the art of specific applications.

The medium according to this invention may show positive dielectric anisotropy or negative dielectric anisotropy or may change its dielectric anisotropy from the positive value to negative one when the frequency of electric field increases.

According to the invention, the medium has especially favorable properties if it is composed of two and three ring compounds simultaneously.

In order to obtain the medium of negative dielectric anisotropy the compounds of general formula I, where fluorine substituents are placed in neighboring positions (proximal position). For this purpose the compounds with subformulas: I.3, I.4, I.5, I.6, I.7, I.13 and I.14, are especially favorable. Such medium may be also formulated from compounds I and other compounds, among them compounds II are recommended. Out of which especially favorable are the ones derived from the general formula II of which definition is listed below:

p=0, $Z_1$=$Z_2$—single bond and

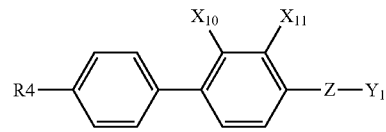

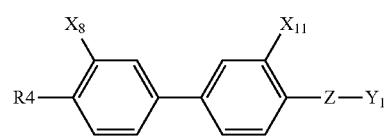

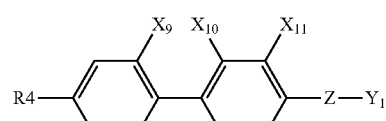

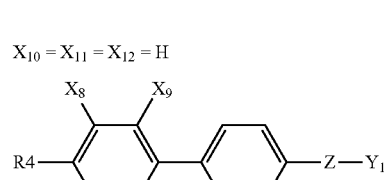

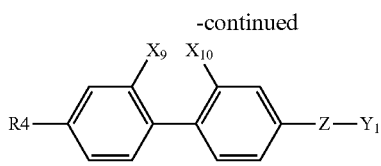

p=1, $Z_1 = Z_2$—single bond and

II.6

$X_8 = X_9 = X_{12} = H$

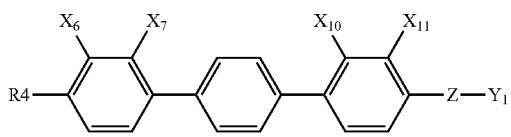

II.7

$X_8 = X_9 = X_{10} = X_{11} = X_{12} = H$

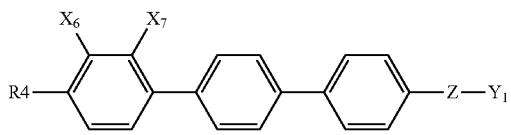

II.8

$X_6 = X_7 = X_{10} = X_{11} = X_{12} = H$

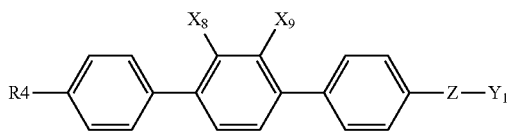

II.9

$X_6 = X_7 = X_8 = X_9 = X_{12} = H$

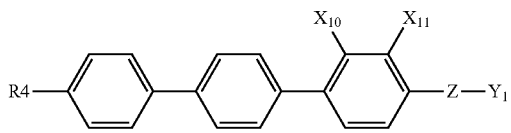

p=0, $Z_1$—single bond, $Z_2$—triple bond C≡C and

II.10

$X_8 = X_9 = X_{12} = H$

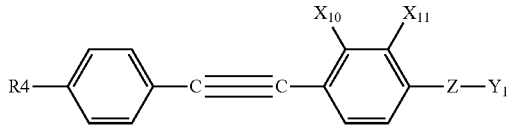

II.11

$X_{12} = H$

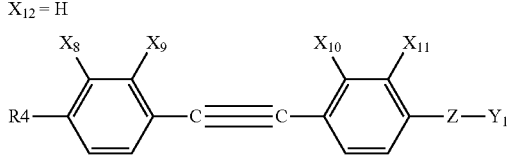

II.12

$R_4 = H_{2s+1}C_sC_6H_{10}, X_{12} = H$

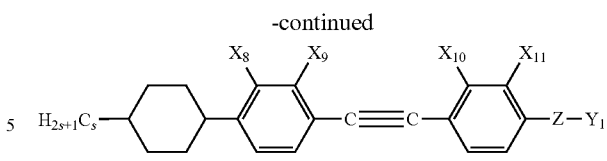

p=1, $Z_1$—single bond, $Z_2$—triple bond C≡C and

II.13

$X_6 = X_7 = X_8 = X_9 = X_{12} = H$

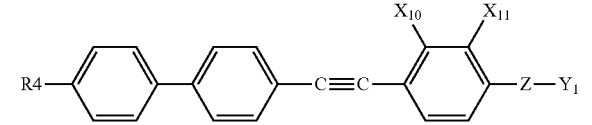

II.14

$X_6 = X_7 = X_{10} = X_{11} = X_{12} = H$

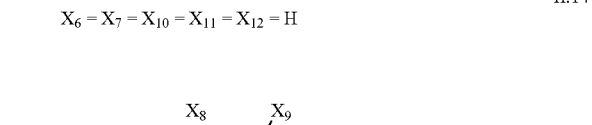

II.15

$X_6 = X_7 = X_{12} = H$

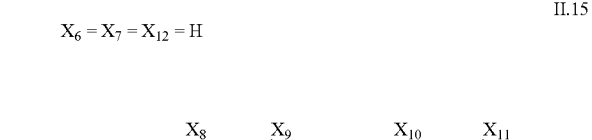

wherein R4 and $Y_1$ represent alkyl groups, each of 1 to 7 carbon atoms independently (s integer of 1 to 7), Z is the oxygen atom or single bond, the lateral substituents $X_6$-$X_{11}$ are fluorine atoms.

To obtain a liquid crystalline medium of positive dielectric anisotropy one should combine compounds of general formula I like subformulas: I.1, I.2, I.8, I.9, I.10, I.11 or compounds I and II especially selected in such way that fluorine atoms have dipole moments pending at the direction of the long molecular axis. For example it is preferred to combine two or three ring compounds of subformulas II16-II.32 of created from the general formula II by definition given below:

p=0, $Z_1 = Z_2 = Z$—single bond and

II.16

$X_8 = X_{10} = X_{11} = X_{12} = H$

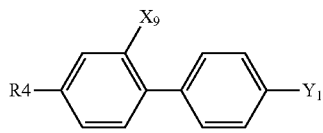

II.17

$X_8 = X_{10} = X_{12} = H$

-continued

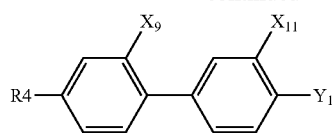

$X_8 = X_9 = X_{10} = X_{12} = H$

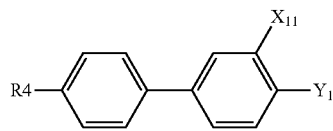

$R4 = H_{2s+1}C_sC_6H_{10}, X_8 = X_9 = X_{10} = H$

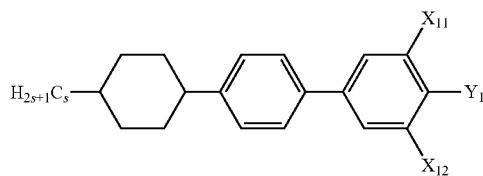

p=1, $Z_1=Z_2=Z$—single bond and

II.20

$X_6 = X_8 = X_9 = X_{10} = X_{11} = X_{12} = H$

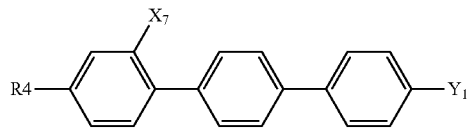

II.21

$X_6 = X_7 = X_8 = X_{10} = X_{12} = H$

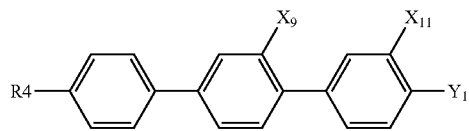

$X_6 = X_7 = X_8 = X_9 = X_{10} = H$

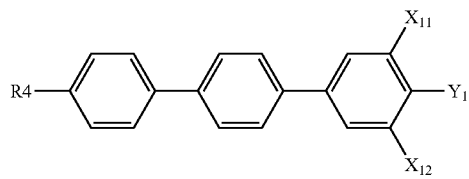

p=0, $Z_2$—triple bond C≡C, $Z_1=Z$—single bond and $X_8 = X_9 = X_{10} = X_{12} = H$

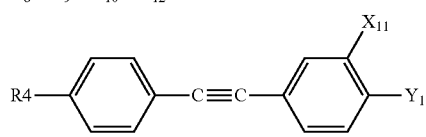

II.24

$X_8 = X_9 = X_{10} = H$

-continued

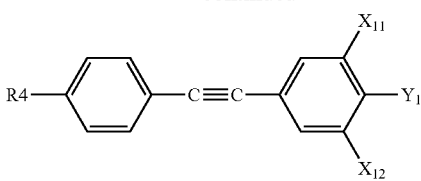

II.18 p=1, $Z_2$—triple bond C≡C, $Z_1=Z$—single bond and

II.25

$X_6 = X_7 = X_8 = X_9 = X_{10} = X_{12} = H$

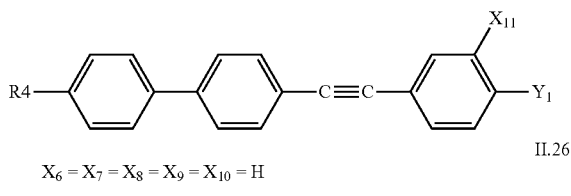

II.26

$X_6 = X_7 = X_8 = X_9 = X_{10} = H$

II.19

II.22

II.23

II.27

$X_6 = X_7 = X_8 = X_{10} = X_{12} = H$ p=1, $Z_1=Z_2$—triple bond C≡C, Z—single bond and

II.28

$X_6 = X_7 = X_8 = X_{10} = X_{12} = H$ p=1, $Z_1=Z$—single bond, $Z_2$—triple bond C≡C and

II.29

$R4 = H_{2s+1}C_sC_6H_4$, $X_8 = X_{10} = H$

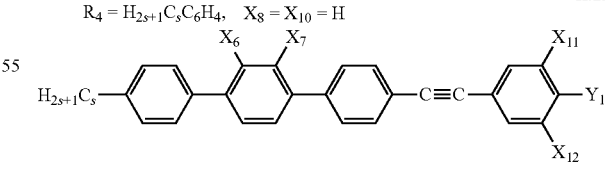

p=0, $Z_1=Z_2=Z$—single bond, $R4=H_{2s+1}C_sC_6H_{10}$—$C_6H_{10}$ and

II.30

$X_8 = X_9 = X_{10} = H$

-continued

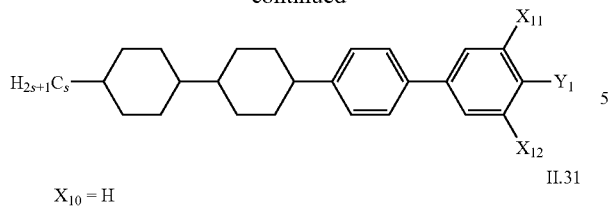
II.31

$X_{10} = H$

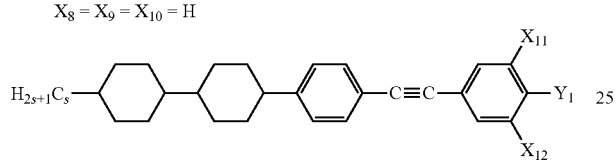
II.32 p=0, $Z_2$—triple bond C≡C, $Z_1$=Z—single bond, R4=$H_{2s+1}C_sC_6H_{10}$—$C_6H_{10}$ and $X_8 = X_9 = X_{10} = H$ wherein R4 is an alkyl group each of 1 to 7 carbon atoms (s integer of 1 to 7), $Y_1$ is fluorine atom or NCS or $OCF_3$ or $CF_3$ group, $X_6$-$X_{12}$ are fluorine atoms.

If compounds II-25-II.32 or similar ones are added to the negative anisotropy mixture prepared as described herein, then it is converted to a mixture with the frequency dependent sign of the dielectric anisotropy. It gets the ability of being driven by two electric field waveforms of different frequencies, then not only the rise time but also fall time becomes dependent on the electric field and the total response can be significantly reduced. The mixture according to this invention is characterized by the low cross-over frequency value, what allows to avoid the dielectric heating.

Besides mentioned components the liquid crystal medium according to the invention may comprise also chiral compounds in different amounts in order to obtain cholesteric structure (higher concentration of an chiral compound) or to form twisted monodomain structure (lower concentration). The chiral compounds are chosen individually depending on the kind of chiral centre and its helical twisting power and they are added in amounts of 0.1-15% by weight. The presence of chiral compounds is necessary in case of ferroelectric or blue phase mixtures and it can exceed even 30%.

The third aspect of the invention is a smectic ferroelectric medium, composed of at least two compounds of general formula I, wherein R3 is an alkyl ($H_{2n+1}C_n$) or an alkenyl ($H_{2n-1}C_n$) group, each of 1 to 12 carbon atoms (n integer of 1 to 12), the ring A is laterally unsubstituted benzene or pyridine or pyrimidine or trans-substituted cyclohexane ring, symbol r is 0 to 2; the lateral substituents: $X_1$, $X_3$, $X_5$ in the benzene rings represent independently hydrogen atoms or fluorine atoms, Y is an alkyl ($H_{2m+1}C_m$) or an alkyloxy ($H_{2m+1}C_mO$) or an alkenyl ($H_{2m-1}C_m$) or an alkenyloxy ($H_{2m-1}C_mO$) group, each of 1 to 12 carbon atoms (m integer of 1 to 12). In this mixture one of the components must be in the chiral form (R or S enancjomer) or it contains a known chiral compound. The mixture may also contain other compounds with the smectic C phase to modify its properties. For this purpose compounds of general formula IV are proposed:

IV.1

IV.2

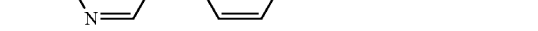
IV.3

IV.4

IV.5

IV.6

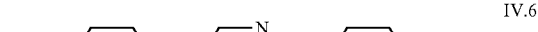
IV.7

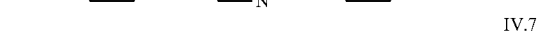
IV.8

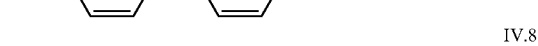
IV.9

IV.10

IV.11

IV.12

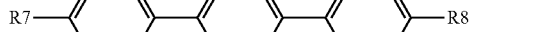

wherein R7 and R8 are independently alkyl, alkenyl, alkyloxy or alkenyloxy groups, each of 1 to 12 carbon atoms, and/or of compounds of general formula II, preferably compounds II.6-II.9 with a longer terminal chain.

The fourth aspect of the invention is a light modulator built according to conventional design but filled with the mixture described in this invention.

The compounds I being the object of this invention are recommended to be obtained with methods presented on the Scheme I. They are more detailed described in examples for I.1-I.6, other compounds of this invention may be obtained in similar way. If chiral chloroformate ClCOOR3 is used (obtained from a chiral alcohol, for example R or S 1-methylheptanol), then prepared compound I is also chiral and keeps the absolute configuration of the used alcohol, if the conditions presented on the Scheme 1 are fulfilled. In examples the syntheses of some new compounds, which were used as the mixture components, are also described.

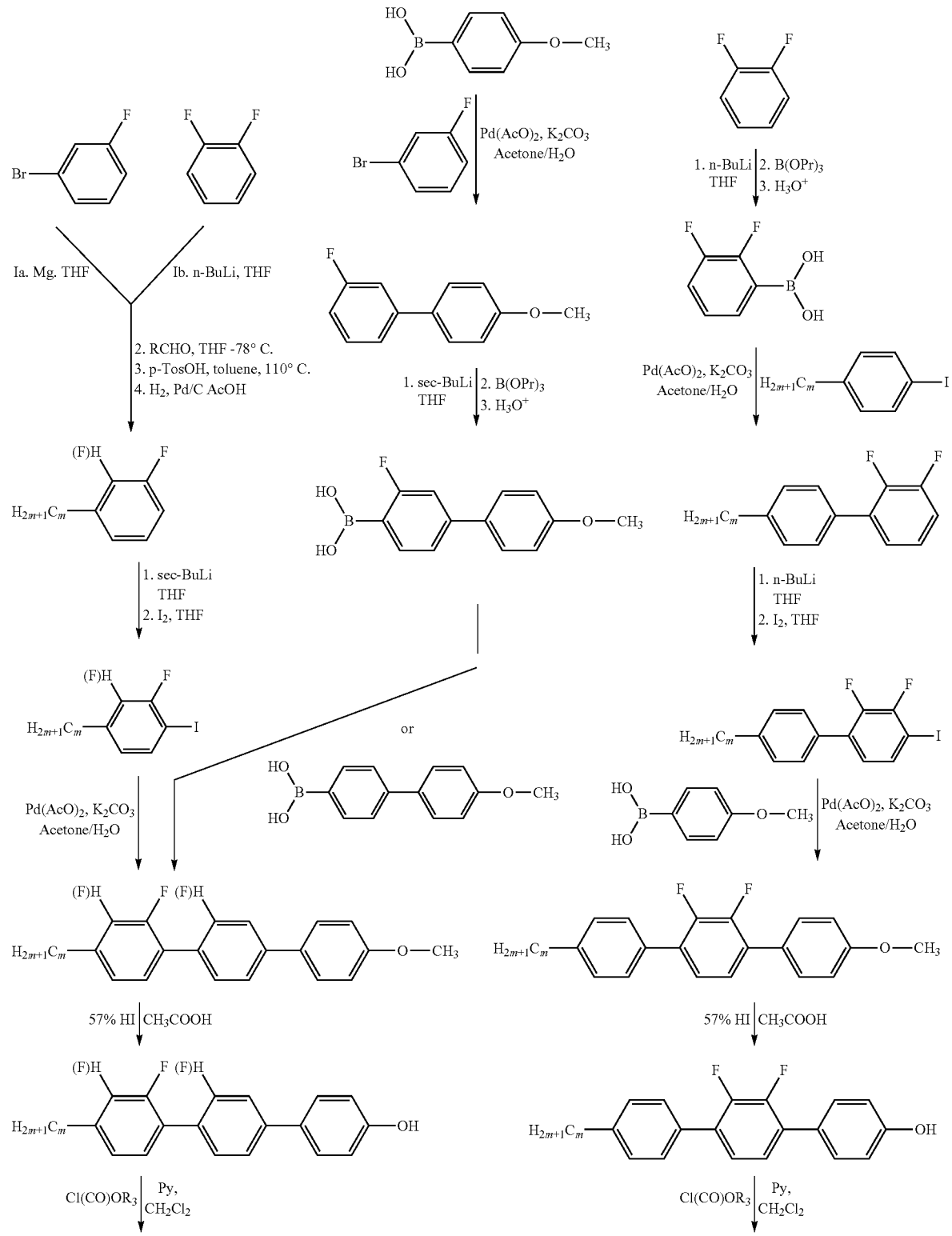

Scheme 1. Synthesis routes of compounds with subformulas I.1, I.3, I.4, I.5 and I.6, Y = $H_{2m+1}C_m$.

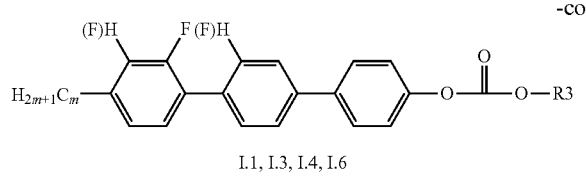

I.1, I.3, I.4, I.6

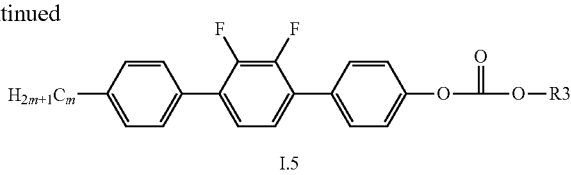

I.5

The examples which follow illustrate the methods of production of the novel compounds expressed by formula I as well as those of obtaining liquid crystalline compositions, however, without limiting the range of the invention.

The values of the dielectric anisotropy (Δ∈) and birefringence (Δn) are given for 20° C.

Phase transitions temperatures are given in ° C.

In presented examples compounds are marked with acronyms given by the following procedure: acronym I.1-3,5 stands for a compound of formula I.1, wherein terminal alkyl groups are propyl and pentyl respectively; acronym I.1-3, NCS stands for a compound with propyl group bonded with carbonate group in one terminal chain and NCS group as a substituent Y at the second terminal position; acronym II.10-3,O4(F,F) stands for a compound of general formula II.10, wherein R4 and $Y_1$ are the propyl and butyl groups respectively, Z is oxygen atom, $X_{10}$ and $X_{11}$ are fluorine atoms; acronym II.15-3,1(F,F,F,F) stands for compound II.15, where R4 and $Y_1$ are the propyl and methyl groups respectively, Z is a single bond, $X_8$, $X_9$, $X_{10}$ and $X_{11}$ are fluorine atoms; acronym II.16-5,F(H) stands for compound II.16, wherein R4 and $Y_1$ are the pentyl group and fluorine atom respectively, $X_9$ is hydrogen atom; acronym II.30-4,OCF$_3$(F,F) stands for compound II.30, where s is equal to 4, $Y_1$ is OCF$_3$ group, $X_{11}$ and $X_{12}$ are fluorine atoms.

Example 1

Synthesis of 2"-fluoro-4"-propyl[1,1',4',1"]terphenyl-4-yl propyl carbonate (Compound I.1-3,3)

Stage I. 1-fluoro-3-propylbenzene

Magnesium chips (13.2 g) were placed into a 1 L flask equipped with mechanical stirrer, nitrogen inlet, 500 ml pressure-equilibrated dropping funnel, thermometer and reflux condenser connected to the inert gas outlet. The flask was flushed with nitrogen and minor flow was held during whole reaction time. 1-Bromo-3-fluorobenzene (95 g, 0.542 mol) and dry tetrahydrofurane (300 ml) was placed in dropping funnel. Magnesium was moistened with few milliliters of the solution from dropping funnel and an iodine crystal was added. When exothermic reaction starts 1-bromo-3-fluorobenzene solution was added dropwise to keep the boiling temperature of the mixture. After dropping all of the solution, the mixture was refluxed for 2 hours. Then the mixture was cooled down to −78° C. in a dry ice/acetone bath and propionaldehyde was added dropwise while mixture temperature was kept below −70° C. After adding all of the aldehyde, the mixture was left overnight at room temperature. Then the tetrahydrofurane was evaporated and the residue was acidified with hydrochloric acid. The organic phase was separated, washed twice with water and dried over magnesium sulfate. The raw 1-(3-fluorophenyl)propanol was distilled under reduced pressure of 20 mbar at 117° C. Alcohol 60 g, 66% of theor. yield was obtained. The alcohol and toluene (250 ml) and p-toluenesulfonic acid (0.2 g) were placed in (500 ml) round-bottom flask equipped with Dean-Stark trap. The mixture was refluxed. After the water stopped appearing, toluene was evaporated at reduced pressure. The obtained 1-(3-fluorophenyl)propene was placed in a three-necked flask and acetic acid (30 ml), ethyl acetate (50 ml) and catalyst—palladium on active carbon (2 g) were added. The flask was filled with hydrogen from gas burette at room temperature and the mixture was stirred. Reaction temperature increased spontaneously to 30° C. When the absorption of hydrogen was stopped, the catalyst was filtered off, the solution was washed off with water, dried over MgSO$_4$ and the solvent was evaporated. The 1-fluoro-3-propylbenzene was distilled under atmospheric pressure, collecting the fraction boiling at 160° C. 32 g of 1-fluoro-3-propylbenzene were obtained, 42% of theor. yield.

Stage II. 2-fluoro-1-iodo-4-propylbenzene

1-Fluoro-3-propylbenzene (30 g, 0217 mol) and dry tetrahydrofurane (300 ml) were placed in 1 L flask equipped with mechanical stirrer, nitrogen inlet and outlet, 250 ml pressure-equilibrated dropping funnel and thermometer. The mixture was cooled down to −78° C. in a dry ice/acetone bath and 1.3 mol/L sec-butyllithium solution (170 ml, 0.221 mol) was added dropwise and the reaction temperature was kept below −70° C. After addition of all butyllithium solution the mixture was stirred for 2 hours at −78° C. and iodine (55.12 g, 0.217 mol) in dry tetrahydrofurane was added dropwise. Cooling bath was removed and heating to room temperature was allowed. The tetrahydrofurane was evaporated using rotary evaporator and the oily substance was washed off in separation funnel with sodium sulfite solution. Organic phase was separated dried over magnesium sulfate and filtered. The product was distilled under reduced pressure 0.4 mmHg, collecting the fraction of the transparent liquid boiling at 60° C. 43 g of 2-fluoro-1-iodo-4-propylbenzene was obtained, 75% of theor. yield.

Stage III. 2"-fluoro-4-ethoxy-4"-propyl[1,1',4',1"]terphenyl

4-Iodo-3-fluoro-1-propylbenzene (20 g, 0.076 mol), potassium carbonate (31.46 g, 0.228 mol), 4'-ethoxybiphenyl-4-yl boronic acid (22.1 g, 0.091 mol), water (100 ml) and acetone (300 ml) were placed in a 750 ml three necked round-bottom flask equipped with reflux condenser connected to the inert gas outlet, thermometer, mechanical stirrer and nitrogen inlet. The reaction flask was flushed with nitrogen and minor flow was held during whole reaction time. The mixture was heated up to the boiling point to degas the reaction system and then cooled down to 40° C. and the catalyst palladium acetate (0.1 g) was added. Temperature increased by few degrees and the solution turned brown. The mixture was refluxed for 6 hours, then was cooled down, poured on water and the solid product was filtered off under reduced pressure. The product was recrystallized from ethanol (400 ml). Finally 19.7 g of white solid was obtained with 81% of theor. yield, phase transition temperatures Cr 139 N 203.2 Iso.

Stage IV. 2"-fluoro-4-hydroxy-4"-propyl[1,1',4',1"]terphenyl

2"-Fluoro-4-ethoxy-4"-propyl[1,1',4',1"]terphenyl (18 g, 0.0562 mol), acetic acid (200 ml) and 57% solution of hydroiodic acid (38 g, 0.17 mol) were placed in 500 ml round-bottom flask equipped with reflux condenser, thermometer and dropping funnel filled with of acetic acid anhydride (113 g, 1.11 mol). The anhydride was added slowly dropwise. The reaction mixture was kept in boiling for two days and the liberated ethyl iodide was distilled off using azeotropic head. Then the reaction mixture was poured on the ice-water mixture. The white solid was filtered off, dried and recrystallized from hexane/toluene mixture. The 16 g of white crystals were obtained with 93% of theor. yield.

Stage V. 2"-fluoro-4"-propyl[1,1',4',1"]terphenyl-4-yl propyl carbonate (compound I.1-3,3)

2"-Fluoro-4-hydroxyl-4"-propyl[1,1',4',1"]terphenyl (1 g, 12.6 mmol), pyridine (0.78 g, 9.8 mmol) and dry methylene chloride (50 ml) were placed in single neck round-bottom flask equipped with calcium chloride drying tube and were stirred by magnetic stirrer. Next propyl chloroformate (0.42 g, 3.4 mmol) was added during stirring for 30 minutes. Then 10% solution of hydrochloric acid was added and the stirring was continued for 15 minutes. The biphasic mixture was placed in separated funnel, diluted with water, and the organic layer was separated, dried over $MgSO_4$, filtrated and the solvent was evaporated to dry mass. The crude product was recrystallized from hexane and 1.1 g of white solid was obtained, 86% of theor. yield. The measured phase transition temperatures are: Cr 78 N 173 Iso.

The following compounds were obtained in similar way:

| | |
|---|---|
| I.1-1,2 | Cr88.4N200.4Iso |
| I.1-1,3 | Cr85N207Iso |
| I.1-1,5 | Cr84N195.8Iso |
| I.1-2,2 | Cr102N184.2Iso |
| I.1-2,3 | Cr88N193Iso |
| I.1-2,5 | Cr72N180Iso |
| I.1-3,2 | Cr91.6N168.2Iso |
| I.4-3,5 | Cr75SmC125N172Iso |
| I.4-4,5 | Cr79SmC129N164Iso |
| I.4-4,3 | Cr105SmC125.8N172Iso |

Example 2

Synthesis of 2",3'-difluoro-4"-pentyl[1',4',1"]terphenyl-4-yl ethyl carbonate (Compound I.3-2,5)

Stage I. 3-fluoro-4'-methoxybiphenyl

1-Bromo-3-fluorobenzene (28.8 g, 0.165 mol), potassium carbonate (50 g, 0.362 mol), 4-methoxybenzene boronic acid (27.6 g, 0.182 mol), water (100 ml) and acetone (300 ml) were placed in 1 L round-bottom three necked flask equipped with condenser, thermometer, mechanical stirrer and nitrogen inlet and outlet. The reaction flask was flushed with nitrogen and minor flow was held during whole reaction time. The mixture was heated up to the boiling point to 40° C. to degas the reaction system and then cooled down and the catalyst palladium acetate (0.1 g) was added. The temperature has increased of few degrees and the solution turned brown. The mixture was refluxed for 6 hours, then was cooled down, poured on cold water and the precipitated gray solid was filtered off. The raw product was recrystallized from ethanol (500 ml). The product (28.9 g) in a form of white crystals was obtained, 88% of theor. yield. The melting point 63-64° C.

Stage II. 3-fluoro-4'-methoxybiphenyl-4-yl boronic acid

3-Fluoro-4'-methoxybiphenyl (27.5 g, 0.136 mol) and dry tetrahydrofurane (400 ml) were placed in 1 L flask equipped with mechanical stirrer, thermometer, pressure-equilibrated dropping funnel and nitrogen inlet and outlet. The reaction flask was flushed with nitrogen and minor flow was held during whole reaction time. The mixture was cooled to −78° C. on a dry ice/acetone bath, and sec-butyllithium (110 ml, 0.14 mol) was added dropwise keeping temperature below −70° C. After adding the sec-butyllithium, the mixture was stirred for 2 hours at −78° C. and then tripropyl borate (25.7 g, 0.14 mol) was added dropwise while keeping −70° C. Then the cooling bath was removed and the mixture was continuously stirred to reach the room temperature. Solvents were evaporated and the residue was acidified with 10% solution of hydrochloric acid to hydrolyze boronic acid ester. The propanol was evaporated and solid was filtered off, washed out with hexane and recrystallized from ethanol/water mixture. Boronic acid, white solid (21 g) was obtained with 63% of theor. yield.

Stage III. 2",3'-difluoro-4-methoxy-4"-pentyl[1,1',4',1"]terphenyl and 2",3'-difluoro-4"-pentyl[1,1',4',1"]terphenyl-4-yl ethyl carbonate 2-Fluoro-1-iodo-4-pentylbenzene (6 g, 0.2 mol), potassium carbonate (8.3 g, 0.06 mol), 3-fluoro-4'-methoxybiphenyl-4-boronic acid (5.5 g, 0.022 mol), water (30 ml) and acetone (100 ml) were placed in three necked round-bottom flask equipped with condenser, thermometer, mechanical stirrer and nitrogen inlet and outlet. The reaction flask was flushed with nitrogen and minor flow was held during whole reaction time. The mixture was heated up to the boiling point and then cooled down to 40° C. to degas the reaction system and the catalyst palladium acetate (0.1 g) was added. The temperature has increased by few degrees and the solution turned brown. The mixture was refluxed for 6 hours, then was cooled down, poured on cold water and the precipitated gray solid was filtered off and recrystallized from ethanol. 5.5 g of the product was obtained with 78% of theor. yield, phase transitions: Cr 48 N 138 Iso.

This compound was treated with hydroiodic acid and then ethyl chloroformate in the same way as was described in Stage IV and V of Example I.

2",3'-Difluoro-4"-pentyl[1,1',4',1"]terphertyl-4-yl ethyl carbonate (compound I.3-2,5) as the white solid with following phase transition temperatures: Cr 62.4 N 137.5 Iso was obtained.

The other compounds of series I.3 were obtained in similar way.

They have the following phase transition temperatures:

| | |
|---|---|
| I.3-1,3 | Cr86N167Iso |
| I.3-1,5 | Cr63N152Iso |
| I.3-3,3 | Cr80N133Iso |
| I.3-3,5 | Cr50N122Iso |
| I.3-4,5 | Cr53N118Iso |

Example 3

Synthesis of 2',3'-difluoro-4"-pentyl[1,1',4',1"]terphenyl-4-yl propyl carbonate (Compound I.5-3,5)

Stage I. 2,3-difluorophenyl boronic acid 1,2-Difluorobenzene (40 g, 0.35 mol) and dry tetrahydrofurane (400 ml) were placed in 1 L flask equipped with mechanical stirrer, nitrogen inlet and outlet, pressure-equilibrated dropping funnel and thermometer. The reaction flask was flushed with nitrogen and minor flow was held during whole reaction time. The mixture was cooled down to −78° C. with dry ice/acetone bath and 2.5 mol/L hexane solution of n-butyllithium (140 ml; 0.35 mol) was added dropwise, keeping the reaction temperature below −70° C. After addition of all butyllithium solution the mixture was stirred at −78° C. for 2 h and then tripropylborate (66 g, 0.35 mol) was added dropwise keeping the reaction temperature below −70° C. After addition of tripropyl borate the cooling bath was removed and the reaction mixture continuously stirred to reach the room temperature then the solvents were evaporated. The thick liquid residue was acidified and then propanol was evaporated and the remaining solid was filtered off, washed out with hexane and recrystalized from water. The white crystalline product 47 g was obtained, with 85% of theor. yield.

Stage II. 2',3'-difluoro-4-pentylbiphenyl

1-Iodo-4-pentylbenzene (82 g, 0.3 mol), potassium carbonate (100 g, 0.72 mol), 2,3-difluorophenyl boronic acid (47 g, 0.3 mol), water (100 ml) and acetone (300 ml) were placed in a round-bottom three necked flask equipped with condenser, thermometer, mechanical stirrer, nitrogen inlet and outlet. The reaction flask was flushed with nitrogen and minor flow was held during whole reaction time. The mixture was heated up to the boiling point to degas the reaction system and then cooled down to 40° C. and the catalyst palladium acetate (0.1 g) was added. The temperature has increased by a few degrees and the solution turned brown. The mixture was refluxed for three days, then it was cooled down, poured on cold water and extracted with dichlorometane and the organic phase separated, dried over $MgSO_4$ and dichlorometane was distilled off. The residue was distilled under reduced pressure at 0.2 mmHg collecting the fraction at 133° C. The colorless liquid fraction 41.5 g of was obtained, 53% of theor. yield.

Stage III. 2',3'-difluoro-4'-iodo-4-pentylbiphenyl

2',3'-Difluoro-4-pentylbiphenyl (612 g, 0.243 mol), and dry tetrahydrofurane (400 ml) were placed in 1 L flask equipped with mechanical stirrer, nitrogen inlet and outlet, pressure-equilibrated dropping funnel and thermometer. The reaction flask was flushed with nitrogen and minor flow was held during whole reaction time. The mixture was cooled down to −78° C. on the dry ice/acetone bath and then 2.5 mol/dm$^3$ of n-butyllithium solution in hexane (100 ml 025 mol) was added dropwise, keeping the reaction temperature below −70° C. After addition of all n-butyllithium the mixture was stirred for additional 2 hours at −78° C. Next iodine solution in tetrahydrofurane (63.5 g, 0.25 mol) was added dropwise maintaining the temperature below −70° C. After addition of the iodine solution the cooling bath was removed and the mixture was stirred to reach the room temperature. Organic solvents were evaporated and the thick oily residue was diluted with hexane and treated with water solution of sodium sulfite to remove the remaining iodine. Phases were separated and hexane was evaporated. The residue was distilled under reduced pressure 1 mmHg collecting the fraction boiling at 174-175° C. The colourles liquid product 71 g was obtained with 78% of theor. yield.

Stage IV. 2',3'-difluoro-4-methoxy-4"-pentyl[1,1'; 4',1"]terphenyl

2',3'-Difluoro-4-iodo-4'-pentylbiphenyl (31.6 g, 0.082 mol), potassium carbonate (22 g, 0.16 mol), 4-methoxyphenyl boronic acid (15 g, 0.098 mol), water (50 ml) and acetone (250 ml) were placed in three necked round-bottom flask equipped with condenser, thermometer, mechanical stirrer and nitrogen inlet and outlet. The reaction flask was flushed with nitrogen and minor flow was held during whole reaction time. The mixture was heated up to the boiling point to degas the reaction system and then cooled down to 40° C. and the catalyst palladium acetate (0.1 g) was added. The temperature has increased by a few degrees and the solution turned brown. The mixture was refluxed for 6 hours, then was cooled down, poured on cold water and the precipitated gray solid was filtered off and crystallized from ethanol (500 ml). The white crystalline solid product 27 g was obtained, 90% of theor. yield, phase transitions: Cr 93 N 166 Iso.

The compound was then treated successively with hydroiodic acid and propyl chloroformate as it is described in stage IV and V of Example I.

2',3'-Difluoro-4"-pentyl[1,1';4',1"]terphenyl-4-yl propyl carbonate (compound I.5-3,5) was obtained with following phase transitions: Cr 68.9 N 158.8 Iso.

The compounds of series I.5 were obtained in similar way. They have phase transitions:

| I.5-1,3 | Cr139N200.8Iso |
| I.5-2,3 | Cr120N188.5Iso |
| I.5-3,3 | Cr81.5N173.1Iso |
| I.5-1,5 | Cr78N183.5Iso |
| I.5-2,5 | Cr73.4N171Iso |
| I.5-4,5 | Cr54.9N152.5Iso |

Example 4

4'-[4-(Propylphenyl)]-2,2',3,3'-tetrafluoro-4-butyltolane (Compound II.15-3,4 (F,F,F,F))

4-Ethynyl-2,3-difluoro-4'-propylbiphenyl (29.6 g, 0.1 mol) solution in tetrahydrofurane was added dropwise to a mixture of 4-butyl-2,3-difluoro-1-iodobenzene (25.6 g, 0.1 mol), $(PPh_3)_2PdCl_2$ (2 g), $(C_2H_5)_3N$ (15.2 g, 0.15 mol), DBU (5 ml) and tetrahydrofurane (200 ml) during stirring at room temperature in nitrogen atmosphere. The exothermic reaction started and the temperature raised up to 40° C. The mixture was then heated and kept in boiling for 2 hours. Next it was cooled down and poured on water. The dark solid was filtered off, dried and dissolved in toluene. The solution was poured through the layer of activated carbon, dried over $MgSO_4$, and then filtered through the pad of Fuller's earth. Toluene was evaporated and the raw product was crystallized from acetone-methanol solution (4:1). White crystalline solid was obtained, 19.9 g, 46.8% of yield, phase transitions: Cr 41.9 N 151.5 Iso.

Compound II.15-3,1(F,F,F,F) was synthesized by analogy, its phase transitions are Cr 81 N 167.4 Iso.

Example 5

4'-(trans,trans-4'-Butyl-4-bicyclohexyl)-3,5-difluoro-4-trifluoromethoxybiphenyl (Compounds II.30-4, OCF$_3$(F,F))

The mixture consisting of 4-trifluoromethoxy-2,6-difluorophenyl boronic acid (1.9 g, 0.012 mol), 4-(trans,trans-4'-butyl-bicyclohexyl)iodobenzene, potassium carbonate (6 g, 0.04 mol), acetone (100 cm$^3$), tetrahydrofurane (70 cm$^3$) and water (50 cm$^3$) in the reaction flask was flushed with nitrogen and minor flow was held during whole reaction time. The mixture was heated up to the boiling point to degas the reaction system and then cooled down to 40° C. and the catalyst palladium acetate (0.05 g) was added. The solution turned dark brown, then the mixture was refluxed for 2 hours. Then it was cooled down, poured on cold water and the precipitated gray solid was filtered off and dissolved in toluene. The toluene solution was dried over $MgSO_4$, filtrated and toluene was evaporated. The solid residue was crystallized from acetone, 3.8 g of white crystals were obtained, 83% of theor. yield, phase transition: Cr 94.8 N 226 Iso.

In similar way the following compounds were obtained:

| | |
|---|---|
| II.30-2,OCF$_3$(F,F) | Cr93.8N250Iso |
| II.30-3,OCF$_3$(F,F) | Cr114.6N280Iso |
| II.30-5,OCF$_3$(F,F) | Cr80.5N268Iso |

Example 6

The compound I.1-2,5 prepared according to the invention has phase transitions: Cr 72 N 180 Iso,
while similar compounds: 2-2,5 and 4-2,5 prepared according to the claimed formula in [U.S. Pat. No. 4,594,465] patent, have phase transitions respectively: Cr 76.2 SmA 126.6 N 194.8 Iso and Cr 91.9 SmE 144.9 SmB 163 SmA 203.8 Iso.

Example 7

The compound I.1-1,5 prepared according to the invention has phase transitions: Cr 84 N 195.8 Iso,
while similar compounds: 2-1,5 and 4-1,5 prepared according to claimed formula in [U.S. Pat. No. 4,594,465] patent have phase transitions respectively: Cr 88.3 SmA 123 N 194.8 Iso and Cr 86.2 SmE 154.7 SmB 166 SmA 207.2 Iso

Example 8

Compound 1.5-3,3 prepared according to this invention has phase transitions: Cr 81.5 N 173.1 Iso,
while similar compound 5-3,3 with the same terminal chains but with fluorine atoms nearby to the carbonate group has phase transitions: Cr 106.5 SmA 139 N 174.7 Iso.

Example 9

Mixture of Composition

| | |
|---|---|
| I.5-1,5 | 3.12% wt. |
| I.5-3,3 | 1.23% wt. |
| I.3-1,5 | 20.94% wt. |
| I.3-2,5 | 8.60% wt. |
| II.10-3,O4(F,F) | 17.66% wt. |
| II.10-5,O2(F,F) | 7.93% wt. |
| II.10-5,O3(F,F) | 17.51% wt. |
| II.10-5,O4(F,F) | 23.01% wt. | exhibits following phase transitions: Cr<0 N 78.4 Iso and $\Delta\varepsilon = -3.81$ ($\varepsilon_\parallel = 4.80$ and $\varepsilon_\perp = 8.61$ for 1 kHz), $\Delta n = 0.2549$ ($n_o = 1.5002$ and $n_e = 1.7551$) at temperature 20° C.

Example 10

Mixture of Composition

| | |
|---|---|
| I.3-1,5 | 20.76% wt. |
| I.5-3,3 | 1.25% wt. |
| I.8-1,3 | 8.24% wt. |
| II.1-3,O2(F,F) | 12.15% wt. |
| II.10-3,O4(F,F) | 18.44% wt. |
| II.10-5,O2(F,F) | 8.29% wt. |
| II.15-3,1(F,F,F,F) | 3.80% wt. |
| II.15-3,4(F,F,F,F) | 27.07% wt. | exhibits following phase transitions: Cr<0 N 87.4 Iso and $\Delta\varepsilon = -3.88$ ($\varepsilon_\parallel = 4.9$ and $\varepsilon_\perp = 8.78$ for 1 kHz), $\Delta n = 0.2642$ ($n_o = 1.5042$ and $n_e = 1.7684$) at temperature 20° C.

Example 11

Mixture of Composition

| | |
|---|---|
| I.1-1,2 | 15.71% wt. |
| I.1-1,5 | 16.70% wt. |
| I.1-3,3 | 37.07% wt. |
| I.1-4,2 | 10.96% wt. |
| I.8-1,3 | 19.56% wt. | exhibits following phase transitions: Cr 20.5 N 146 Iso and $\Delta\varepsilon = 0.22$ ($\varepsilon_\parallel = 4.19$ and $\varepsilon_\perp 3.97$ for 1 kHz), $\Delta n = 0.2532$ ($n_o = 1.5191$ and $n_e = 1.7723$) at temperature 20° C.

Example 12

Mixture of Composition

| | |
|---|---|
| I.7-3,1 | 3.03% wt. |
| II.15-3,4(F,F,F,F) | 23.3% wt. |
| II.10-3,O2(F,F) | 3.43% wt. |
| II.10-3,O3(F,F) | 11.78% wt. |
| II.10-3,O4(F,F) | 15.32% wt. |
| II.10-5,O2(F,F) | 6.76% wt. |
| II.10-5,O3(F,F) | 16.06% wt. |
| II.10-5,O4(F,F) | 20.32% wt. | exhibits following phase transitions: Cr<−20 N 73 Iso and $\Delta\varepsilon = -5.5$ ($\varepsilon_\parallel = 5.3$ and $\varepsilon_\perp = 10.8$ for 1 kHz), $\Delta n = 0.284$ ($n_o = 1.497$ and $n_e = 1.781$) at temperature 20° C.

Example 13

Mixture of Composition

| | |
|---|---|
| I.5-1,3 | 10.00% wt. |
| II.10-3,O2(F,F) | 4.45% wt. |
| II.10-3,O3(F,F) | 14.30% wt. |
| II.10-3,O4(F,F) | 18.79% wt. |
| II.10-5,O2(F,F) | 8.50% wt. |
| II.10-5,O3(F,F) | 19.70% wt. |
| II.10-5,O4(F,F) | 24.26% wt. | exhibits following phase transitions: Cr −15 N 62.4 Iso and Δ∈=−4.93 (∈$_∥$=5.27 and ∈$_⊥$=10.20 for 1 kHz), Δn=0.2275 (n$_o$=1.4938 and n$_e$=1.7213) at temperature 20° C.

Example 14

Dual Frequency Mixture of Composition

| | |
|---|---|
| I.6-3,3 | 10.00% wt. |
| II.10-3,O2(F,F) | 4.45% wt. |
| II.10-3,O3(F,F) | 14.30% wt. |
| II.10-3,O4(F,F) | 18.79% wt. |
| II.10-5,O2(F,F) | 8.50% wt. |
| II.10-5,O3(F,F) | 19.70% wt. |
| II.10-5,O4(F,F) | 24.26% wt. | exhibits following phase transitions: Cr ~0 N 55.9 Iso and Δ∈=−4.98 (∈$_∥$=6.24 and ∈$_⊥$=11.22 for 1 kHz), Δn=0.2219 (n$_o$=1.4930 and n$_e$1.7149) at temperature 20° C.

Example 15

Dual Frequency Mixture of Composition

| | |
|---|---|
| I.1-1,5 | 16.40% wt. |
| II.1-3,O2(F,F) | 12.50% wt. |
| II.10-5,O2(F,F) | 8.72% wt. |
| II.15-3,1(F,F,F,F) | 4.05% wt. |
| II.15-3,4(F,F,F,F) | 27.59% wt. |
| II.19-4,NCS(F,F) | 15.98% wt. |
| II.30-2,NCS(F,F) | 11.36% wt. |
| II.30-5,NCS(F,F) | 3.40% wt. | exhibits following phase transitions: Cr 15 N 148 Iso and Δ∈=2.27 (∈$_∥$=9.74 and ∈$_⊥$=7.47 for 1 kHz), f$_{co}$=3 kHz, Δ∈=−2.7 (∈$_∥$=4.1 and ∈$_⊥$=6.8 for 1 MHz), Δn=0.2805 (n$_o$=1.5151 and n$_e$−1.7956) at temperature 20° C.

Example 16

Dual Frequency Mixture of Composition

| | |
|---|---|
| I.3-1,5 | 7.53% wt. |
| I.5-1,5 | 2.83% wt. |
| II.8-2,3(F,F) | 5.40% wt. |
| II.8-2,4(F,F) | 7.10% wt. |
| II.8-2,5(F,F) | 11.50% wt. |
| II.8-3,4(F,F) | 5.70% wt. |
| II.8-3,5(F,F) | 3.94% wt. |
| III.4-3,O1 | 24.0% wt. |
| III.4-3,O2 | 12.0% wt. |
| II.32-3,OCF$_3$(F,F) | 3.41% wt. |
| II.32-4,OCF$_3$(F,F) | 5.88% wt. |
| II.32-5,OCF$_3$(F,F) | 10.71% wt. | exhibits following phase transitions: Cr −20 N 105 Iso and Δ∈=1.754 (∈$_∥$=6.254 and ∈$_⊥$=4.5 for 1 kHz), f$_{co}$=8.4 kHz, Δ∈=−1.2 (∈$_∥$=3.2 and ∈$_⊥$=4.4 for 1 MHz), Δn=0.1616 (n$_o$=1.5031 and n$_e$=1.6647) at temperature 20° C.

Example 17

The Ferroelectric Mixture of Composition

| | |
|---|---|
| IV.1-O8,O8 | 19.1% wt. |
| IV.1-O9,O9 | 7.4% wt. |
| IV.1-O9,O7 | 11.8% wt. |
| IV.1-O7,O9 | 17.1% wt. |
| IV.1-8,O6 | 17.6% wt. |
| IV.3-8,O8 | 15.0% wt. |
| I.4-4,5 | 5.0% wt. |
| I.4-3,5 | 5.0% wt. |
| (S)-(+) 2-octyl-4,4''-terphenylate | 2.0% wt. | exhibits following phase transitions: Cr 8.0 SmC* 86.8 SmA 90.0 N 102.0 Iso.

What is claimed is:

1. The compound of general formula I

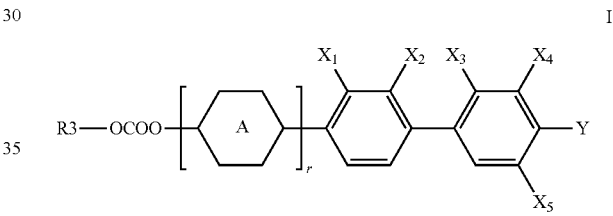

I wherein R3 is an alkyl (H$_{2n+1}$C$_n$) or an alkenyl (H$_{2n-1}$C$_n$) group, each of 1 to 12 carbon atoms (n integer of 1 to 12), the ring A is laterally unsubstituted benzene or pyridine or pyrimidine or trans-substituted cyclohexane ring, symbol r is 0 to 2; the lateral substituents: X$_2$, X$_3$, X$_4$ and X$_5$ in the benzene rings represent independently hydrogen or fluorine or chlorine atoms, X$_1$ is hydrogen or fluorine atom and simultaneously at least one of the substituents: X$_2$, X$_3$ and X$_4$ is fluorine atom or chlorine atom, Y is an alkyl (H$_{2m+1}$C$_m$) or an alkyloxy (H$_{2m-1}$C$_m$O) or an alkenyl (H$_{2m-1}$C$_m$) or an alkenyloxy (H$_{2m-1}$C$_m$O) group, each of 1 to 12 carbon atoms (m integer of 1 to 12) or hydrogen or fluorine or chlorine atom or NCS group.

2. The compound according to the claim 1, expressed by the formula I.1

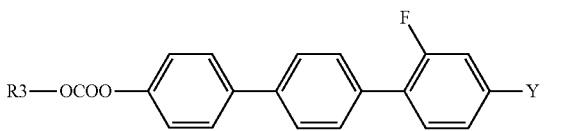

I.1 wherein R3 and Y represent alkyl groups, each of 1 to 12 carbon atoms independently.

3. The compound according to the claim 1, expressed by the formula I.2

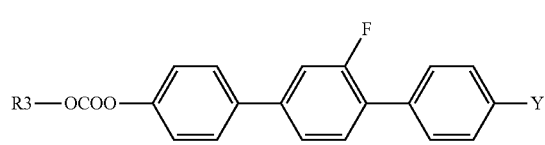

wherein R3 and Y represent alkyl groups, each of 1 to 12 carbon atoms independently.

4. The compound according to the claim 1, expressed by the formula I.3

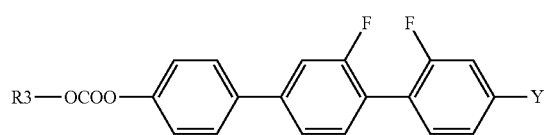

wherein R3 and Y represent alkyl groups, each of 1 to 12 carbon atoms independently.

5. The compound according to the claim 1, expressed by the formula I.4

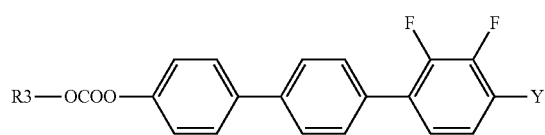

wherein R3 and Y represent alkyl groups, each of 1 to 12 carbon atoms independently.

6. The compound according to the claim 1, expressed by the formula I.5

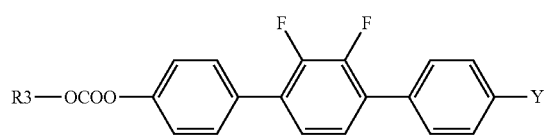

wherein R3 and Y represent alkyl groups, each of 1 to 12 carbon atoms independently.

7. The compound according to the claim 1, expressed by the formula I.6

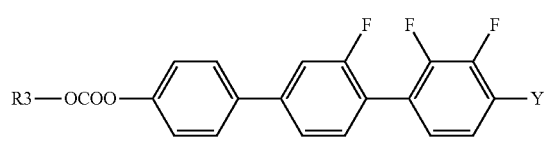

wherein R3 and Y represent alkyl groups, each of 1 to 12 carbon atoms independently.

8. The compound according to the claim 1, expressed by the formula I.7

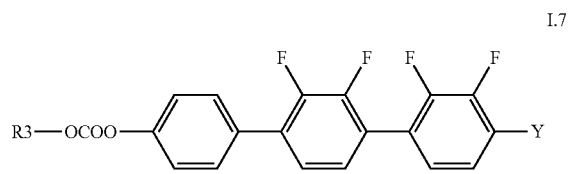

wherein R3 and Y represent alkyl groups, each of 1 to 12 carbon atoms independently.

9. The compound according to the claim 1, expressed by the formula I.8

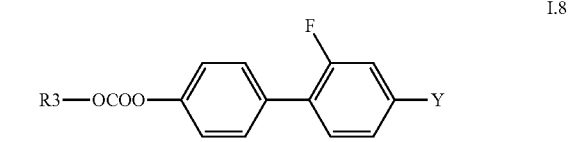

wherein R3 and Y represent alkyl groups, each of 1 to 12 carbon atoms independently.

10. The compound according to the claim 1, expressed by the formula I.10

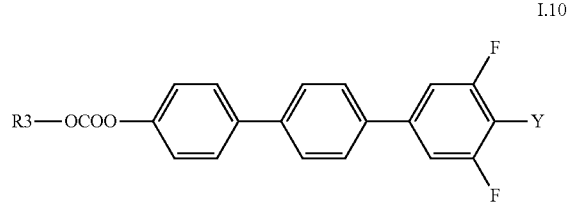

wherein R3 is an alkyl group, comprising 1 to 12 carbon atoms and Y is an alkyl group comprising 1 to 12 carbon atoms or fluorine atom or chlorine atom or NCS group.

11. The compound according to the claim 1, expressed by the formula I.11

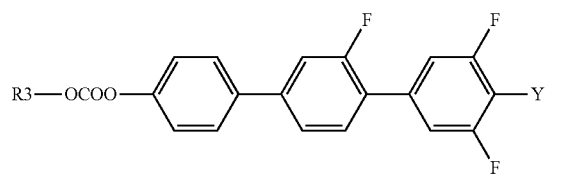

wherein R3 is an alkyl group, comprising 1 to 12 carbon atoms and Y is an alkyl group comprising 1 to 12 carbon atoms or fluorine atom or chlorine atom or NCS group.

12. The compounds according to claim 1 as components of a liquid crystal medium used for the improvement of its properties.

13. A liquid crystalline medium composed of at least two components of general formula I

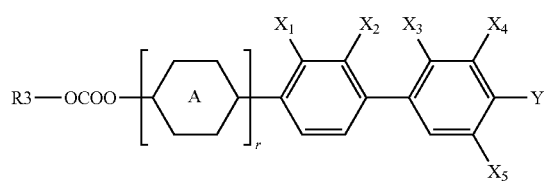

wherein R3 is an alkyl ($H_{2n+1}C_n$) or an alkenyl ($H_{2n-1}C_n$) group, each of 1 to 12 carbon atoms (n integer of 1 to 12), the ring A is laterally unsubstituted benzene or pyridine or pyrimidine or trans-substituted cyclohexane ring, symbol r is 0 to 2; the lateral substituents: $X_2, X_3, X_4, X_5$ in the benzene rings represent independently hydrogen or fluorine or chlorine atoms, $X_1$ is hydrogen or fluorine atom and simultaneously at least one of the substituents: $X_2, X_3$ and $X_4$ is fluorine atom or chlorine atom, Y is an alkyl ($H_{2m+1}C_m$) or an alkyloxy ($H_{2m+1}C_mO$) or an alkenyl ($H_{2m-1}C_m$) or an alkenyloxy ($H_{2m-1}C_mO$) group, each of 1 to 12 carbon atoms (m integer of 1 to 12) or hydrogen or fluorine or chlorine atom or NCS group.

14. A liquid crystalline medium composed of one or more components of general formula I

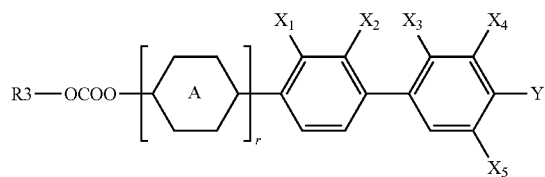

wherein R3 is an alkyl ($H_{2n+1}C_n$) or an alkenyl ($H_{2n-1}C_n$) group, each of 1 to 12 carbon atoms (n integer of 1 to 12), the ring A is laterally unsubstituted benzene or pyridine or pyrimidine or trans-substituted cyclohexane ring, symbol r is 0 to 2; the lateral substituents: $X_2, X_3, X_4, X_5$ in the benzene rings represent independently hydrogen or fluorine or chlorine atoms, $X_1$ is hydrogen or fluorine atom and simultaneously at least one of the substituents: $X_2, X_3$ and $X_4$ is fluorine atom or chlorine atom, Y is an alkyl ($H_{2m+1}C_m$) or an alkyloxy ($H_{2m+1}C_mO$) or an alkenyl ($H_{2m-1}C_m$) or an alkenyloxy ($H_{2m-1}C_mO$) group, each of 1 to 12 carbon atoms (m integer of 1 to 12) or hydrogen or fluorine or chlorine atom or NCS group and one or few components of general formula II

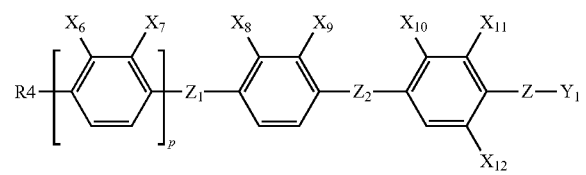

wherein R4 is an alkyl ($H_{2s+1}C_s$) or an alkenyl ($H_{2s-1}C_s$) or an alkylphenyl ($H_{2s+1}C_sC_6H_4$) or an alkylcyclohexyl ($H_{2s+1}C_sC_6H_{10}$) or an alkylbicyclohexyl ($H_{2s+1}C_sC_6H_{10}$—$C_6H_{10}$) group, each of 1 to 7 carbon atoms (s integer of 1 to 7), symbol p is 0 to 2; the lateral substituents: $X_6$-$X_{12}$ represent independently hydrogen or fluorine or chlorine atoms, $Y_1$ is an alkyl ($H_{2t+1}C_t$) or an alkenyl ($H_{2t-1}C_t$) group, each of 1 to 12 carbon atoms (t integer of 1 to 12) or hydrogen or fluorine or chlorine atom or NCS or $CF_3$ group; Z is oxygen atom or single bond, $Z_1$ and $Z_2$ represent independently a single bond or $CF_2O$ group or triple bond (C≡C) and/or one or few compounds from the compounds of the formulas III.1-III.6:

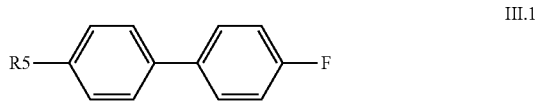

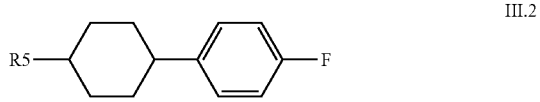

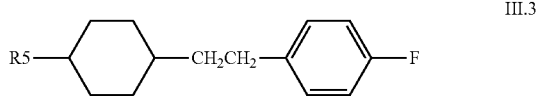

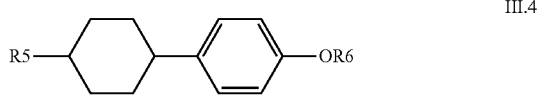

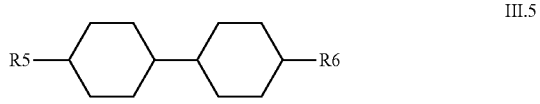

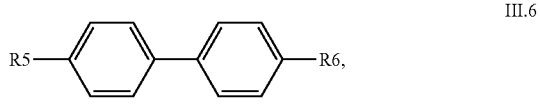

wherein R5 and R6 are independently an alkyl or an alkenyl group, each of 1 to 6 carbon atoms.

15. The liquid crystalline medium according to the claim 13, which consists of two or more compounds of the formula I.1

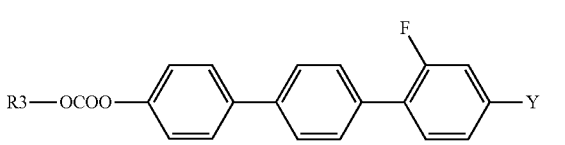

wherein R3 and Y represent alkyl groups, each of 1 to 12 carbon atoms independently.

16. The liquid crystalline medium with positive dielectric anisotropy which consists of at least one component listed below:

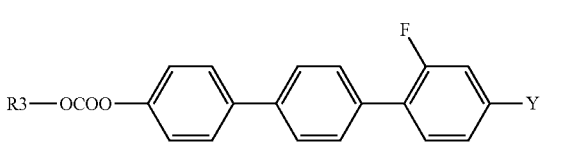

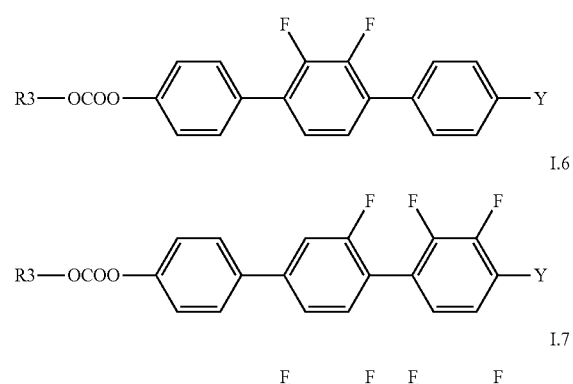

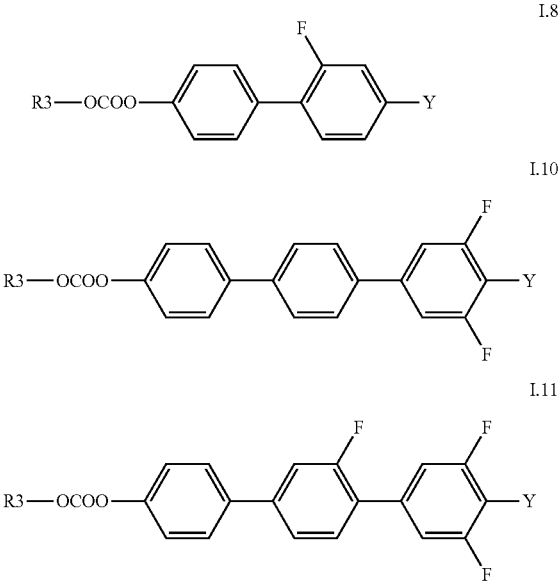

wherein R3 is an alkyl group, comprising 1 to 12 carbon atoms and Y is an alkyl group comprising 1 to 12 carbon atoms or hydrogen or fluorine or chlorine atom or NCS or CF$_3$ or OCF$_3$ groups and at least one of the compounds listed below:

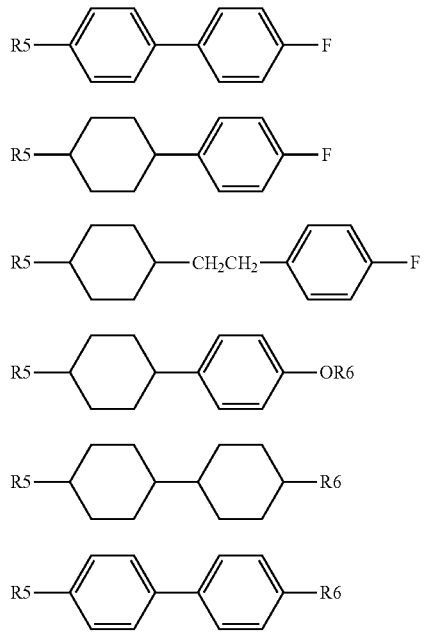

wherein R5 and R6 are independently alkyl or alkenyl groups, each of 1 to 6 carbon atoms.

17. The liquid crystalline medium with negative dielectric anisotropy which consists at least one component listed below:

wherein R3 and Y represent alkyl groups, each of 1 to 12 carbon atoms independently and at least one component listed below:

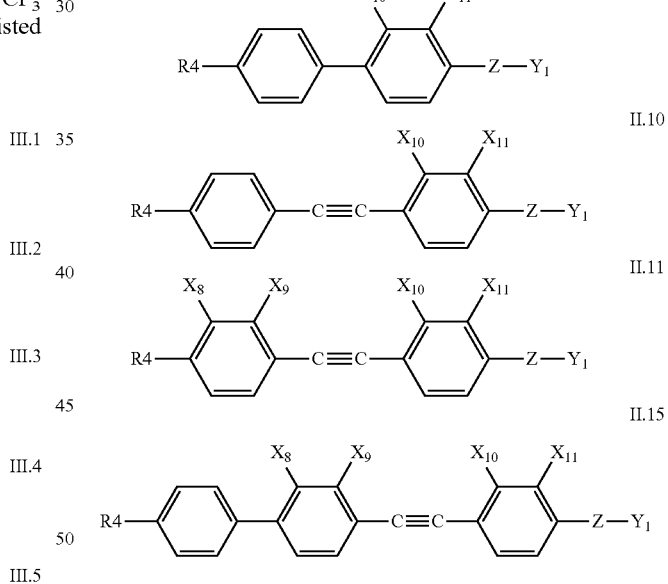

wherein R4 and Y$_1$ represent alkyl groups, each of 1 to 7 carbon atoms independently, Z is oxygen atom or single bond, X$_8$-X$_{11}$ are fluorine atoms.

18. The nematic medium for dual frequency addressing, which consists of at least one component listed below:

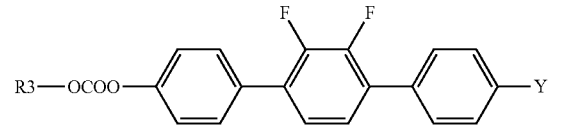

-continued

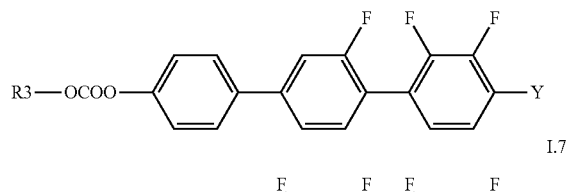

wherein R3 and Y represent alkyl groups, each of 1 to 12 carbon atoms independently and at least one component listed below:

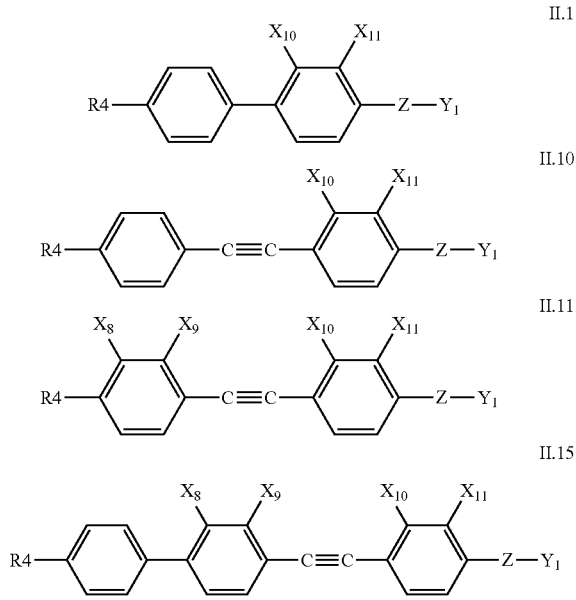

wherein R4 and $Y_1$ represent alkyl groups, each of 1 to 7 carbon atoms independently, Z is oxygen atom or single bond, $X_8$-$X_{11}$ are fluorine atoms and simultaneously one or few components with positive dielectric anisotropy chosen from compounds II.25-II.32.

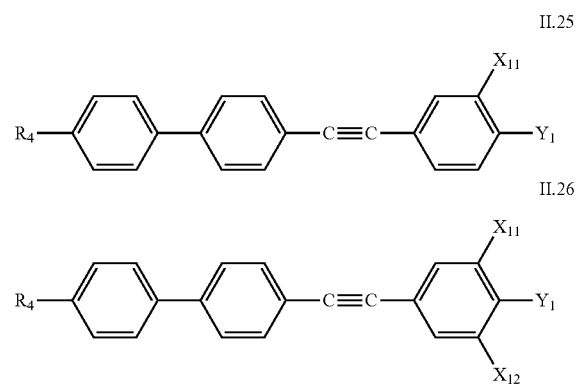

-continued

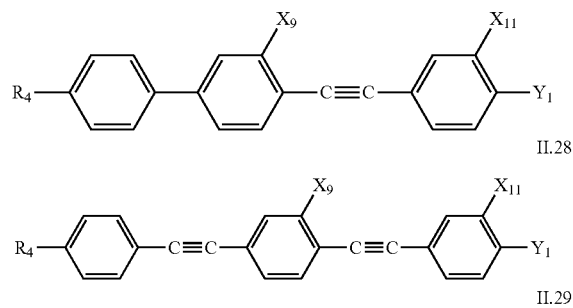

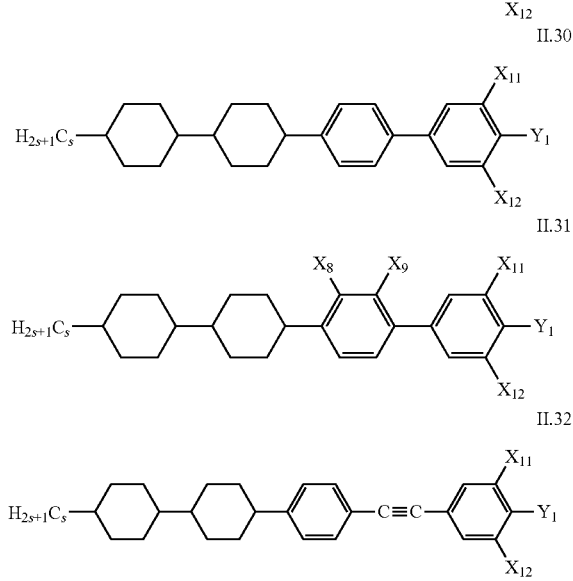

wherein R4 represents an alkyl group, each of 1 to 12 carbon atoms independently, s integer of 1 to 7, $X_6$-$X_{12}$ are hydrogen, fluorine or chlorine atoms independently, $Y_1$ is independently hydrogen or fluorine or chlorine atom or NCS or $OCF_3$ or $CF_3$ group.

19. A ferroelectric liquid crystalline medium, composed of at least two compounds of general formula I

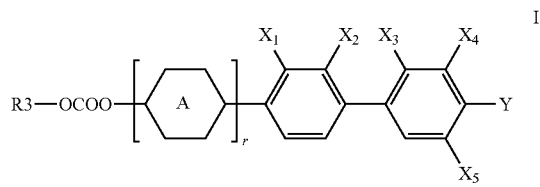

wherein R3 is an alkyl ($H_{2n+1}C_n$) or an alkenyl ($H_{2n-1}C_n$) group, each of 1 to 12 carbon atoms (n integer of 1 to 12), the ring A is laterally unsubstituted benzene or pyridine or pyrimidine or trans-substituted cyclohexane ring, symbol r is 0 to 2; the lateral substituents: $X_1$, $X_2$ and $X_5$ in the benzene rings represent hydrogen atoms, $X_3$ and $X_4$ are fluorine atoms, Y is an alkyl ($H_{2m+1}C_m$) or an alkyloxy ($H_{2m+1}C_mO$) or an alkenyl (H$_{2m-1}$C$_m$) or an alkenyloxy (H$_{2m-1}$C$_m$O) group, each of 1 to 12 carbon atoms independently (m integer of 1 to 12) and at least one of them is in a chiral form (R or S enancjomer) or it contains a known chiral compound.

20. A ferroelectric liquid crystalline medium, composed of one or more compounds of general formula I

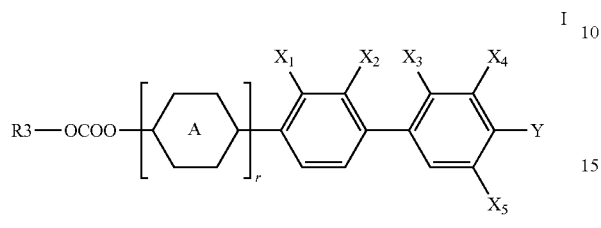

wherein R3 is an alkyl (H$_{2n+1}$C$_n$) or an alkenyl (H$_{2n-1}$C$_n$) group, each of 1 to 12 carbon atoms (n integer of 1 to 12), the ring A is laterally unsubstituted benzene or pyridine or pyrimidine or trans-substituted cyclohexane ring, symbol r is 0 to 2; the lateral substituents: X$_1$, X$_2$ and X$_5$ in the benzene rings represent hydrogen atoms, X$_3$ and X$_4$ are fluorine atoms, Y is an alkyl (H$_{2m+1}$C$_m$) or an alkyloxy (H$_{2m+1}$C$_m$O) or an alkenyl (H$_{2m-1}$C$_m$) or an alkenyloxy (H$_{2m-1}$C$_m$O) group, each of 1 to 12 carbon atoms independently (m integer of 1 to 12) and one or few compounds with the smectic C phase of formulas IV.1-IV.12,

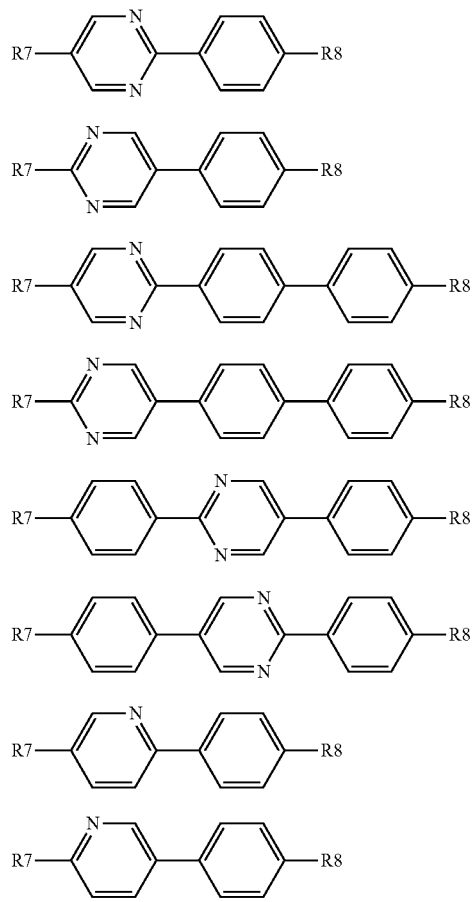

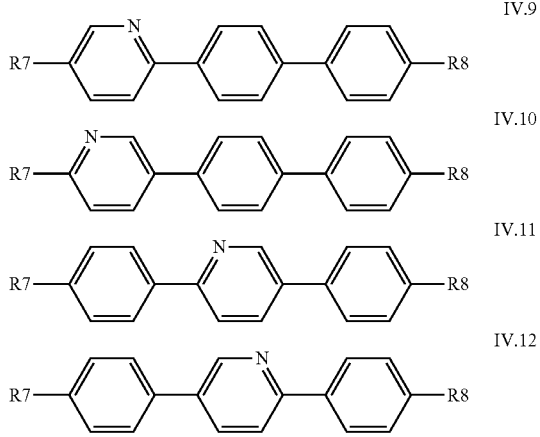

wherein R7 and R8 are respectively an alkyl, an alkenyl, an alkyloxy, an alkenyloxy groups with 1 to 12 carbon atoms independently and wherein at least one component is in a chiral form (R or S enantiomer).

21. The liquid crystalline medium according to claim 20 wherein the said component is:

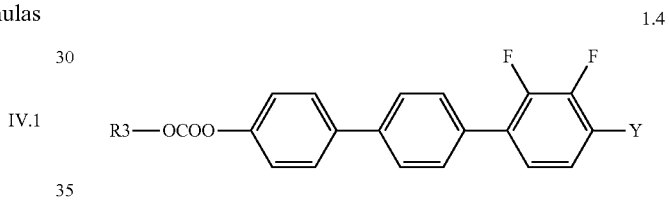

wherein R3 and Y represent alkyl groups, each of 1 to 12 carbon atoms independently.

22. The compound expressed by formula II.15

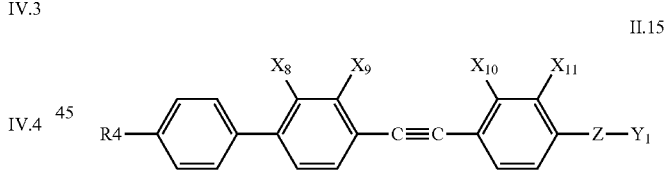

wherein R4 and Y$_1$ represent alkyl groups, each of 1 to 7 carbon atoms independently and substituents, X$_8$=X$_9$=X$_{10}$=X$_{11}$ are fluorine atoms, Z is a single bond, as the component of negative nematic medium.

23. The compound expressed by formula II.11

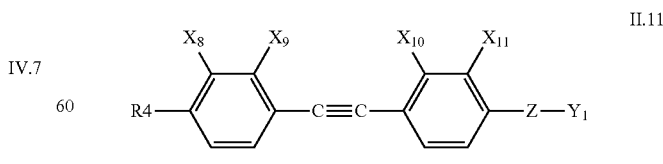

wherein R4 and Y$_1$ represent alkyl groups, each of 1 to 12 carbon atoms independently, Z is a single bond and X$_8$=X$_9$=X$_{10}$=X$_{11}$ are fluorine atoms, as the component of negative nematic medium.

24. The compound expressed by the formula II.30

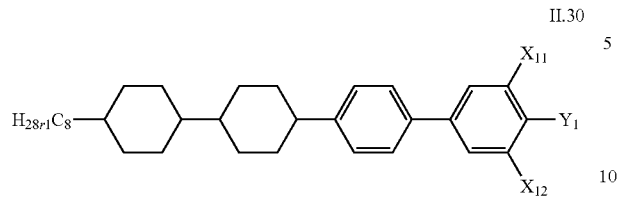

wherein s integer of 1 to 7, $Y_1$ is fluorine atom or NCS or $OCF_3$ or $CF_3$ group, $X_{11}$-$X_{12}$ are fluorine atoms as the component of a nematic dual frequency medium.

25. In liquid crystal devices the improvement that it comprises the liquid crystalline medium as is said in the claim 14.

26. In liquid crystal devices the improvement that it comprises the liquid crystalline medium as is said in the claim 20.

* * * * *